US012552157B2

(12) United States Patent
Kato et al.

(10) Patent No.: US 12,552,157 B2
(45) Date of Patent: Feb. 17, 2026

(54) PRINTING APPARATUS, DISCHARGE STATE DETECTING APPARATUS, AND DISCHARGE STATE DETECTING METHOD

(71) Applicant: BROTHER KOGYO KABUSHIKI KAISHA, Nagoya (JP)

(72) Inventors: Yuya Kato, Nagoya (JP); Haruhisa Takayama, Nagoya (JP); Atsushi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 160 days.

(21) Appl. No.: 18/610,795

(22) Filed: Mar. 20, 2024

(65) Prior Publication Data

US 2024/0326410 A1 Oct. 3, 2024

(30) Foreign Application Priority Data

Apr. 3, 2023 (JP) ................................ 2023-060245

(51) Int. Cl.
*B41J 2/045* (2006.01)
*G01P 3/68* (2006.01)
*G02B 3/00* (2006.01)

(52) U.S. Cl.
CPC ....... *B41J 2/04561* (2013.01); *B41J 2/04551* (2013.01); *B41J 2/04586* (2013.01); *B41J 2/04588* (2013.01); *B41J 2/0459* (2013.01); *B41J 2/04591* (2013.01); *G01P 3/68* (2013.01); *G02B 3/0087* (2013.01)

(58) Field of Classification Search
CPC .. B41J 2/04581; B41J 2/0458; B41J 2/04588; B41J 2/04591; B41J 2/04586; B41J 2/2142; B41J 2/04561; B41J 2/0459; B41J 2/16579; B41J 2/0451; B41J 2/04508; G01P 3/68; G02B 3/0087
See application file for complete search history.

(56) References Cited

U.S. PATENT DOCUMENTS

2006/0158477 A1 * 7/2006 Kusakari .............. B41J 2/04581 347/42

FOREIGN PATENT DOCUMENTS

JP 2001293849 A 10/2001

* cited by examiner

*Primary Examiner* — Thinh H Nguyen
(74) *Attorney, Agent, or Firm* — Element IP, PLC

(57) ABSTRACT

There is provided a printing apparatus including: a head having a discharge surface in which a nozzle configured to discharge a liquid droplet in a first direction is opened; a light-emitter configured to emit light; a light-receiver configured to receive the light; a gradient adding member configured to add a gradient to a light intensity of an optical path of the light in each of second and third directions, the second and third directions intersecting the first direction, the second and third directions intersecting with each other; and a controller. The optical path intersects a flying area in which the liquid droplet from the nozzle flies at a position between the gradient adding member and the light-receiver. The controller is configured to detect a deviation of a flying direction of the liquid droplet based on an amount of the light received by the light-receiver.

21 Claims, 19 Drawing Sheets

PRINTING APPARATUS, DISCHARGE STATE DETECTING APPARATUS, AND DISCHARGE STATE DETECTING METHOD

REFERENCE TO RELATED APPLICATIONS

This application claims priority from Japanese Patent Application No. 2023-060245 filed on Apr. 3, 2023. The entire content of the priority application is incorporated herein by reference.

BACKGROUND ART

For example, a printing apparatus, which is provided with a printing head that has nozzles for discharging (ejecting) ink droplets, a light-emitting unit, and a light-receiving unit, is known as a conventional printing apparatus. When the ink droplets, which are discharged from the nozzles, interrupt the light emitted from the light-emitting unit, the light amount, which is to be received by the light-receiving unit, is decreased. Accordingly, the printing apparatus detects the discharge of the ink droplets from the nozzles.

SUMMARY

In the case of the printing apparatus as described in Japanese Patent Application Laid-Open No. 2001-293849, the discharge and the discharge failure of the nozzle are detected on the basis of the presence or absence of the decrease in the light-receiving amount obtained by the light-receiving unit. However, even when the ink droplet is discharged from the nozzle to a printing medium, the ink droplet does not fry in a desired direction directed to the printing medium in some cases. The deviation of the flying direction of the ink droplet as described above cannot be detected by the printing apparatus of the conventional technique.

In view of the above circumstances, an object of the present disclosure is to provide a printing apparatus, a discharge state detecting apparatus, and a discharge state detecting method which make it possible to detect a deviation of a flying direction of a liquid droplet discharged from a nozzle.

According to a first aspect of the present disclosure, there is provided a printing apparatus including:

- a head having a discharge surface in which a nozzle configured to discharge a liquid droplet in a first direction is opened;
- a light-emitter configured to emit light;
- a light-receiver configured to receive the light emitted from the light-emitter;
- a gradient adding member configured to add a gradient to a light intensity of an optical path of the light emitted from the light-emitter in each of a second direction and a third direction, the second direction and the third direction intersecting the first direction, the second direction and the third direction intersecting with each other; and
- a controller, wherein:
- the optical path intersects a flying area in which the liquid droplet discharged from the nozzle flies at a position between the gradient adding member and the light-receiver; and
- the controller is configured to detect a deviation of a flying direction of the liquid droplet discharged from the nozzle based on an amount of the light received by the light-receiver.

According to a second aspect of the present disclosure, there is provided a discharge state detecting apparatus for detecting a discharge state of a liquid droplet discharged from a head having a discharge surface in which a nozzle configured to discharge a liquid droplet in a first direction is opened, the discharge state detecting apparatus including;

- a light-emitter configured to emit light;
- a light-receiver configured to receive the light emitted from the light-emitter;
- a gradient adding member configured to add a gradient to a light intensity of an optical path of the light emitted from the light-emitter in each of a second direction and a third direction, the second direction and the third direction intersecting the first direction, the second direction and the third direction intersecting with each other; and
- a controller configured to detect a deviation of a flying direction of the liquid droplet discharged from the nozzle based on an amount of the light received by the light-receiver in a case that the liquid droplet discharged from the nozzle travels through the optical path at a position between the gradient adding member and the light-receiver.

According to a third aspect of the present disclosure, there is provided a discharge state detecting method for detecting a discharge state of a liquid droplet in a printing apparatus: the printing apparatus including:

- a head having a discharge surface in which a nozzle configured to discharge a liquid droplet in a first direction is opened;
  - a light-emitter configured to emit light;
  - a light-receiver configured to receive the light emitted from the light-emitter;
  - a gradient adding member; and
  - a controller, the method including:

- adding a gradient to a light intensity of an optical path of the light emitted from the light-emitter in each of a second direction and a third direction by the gradient adding member, the second direction and the third direction intersecting the first direction, the second direction and the third direction intersecting with each other;
- causing the nozzle to discharge the liquid droplet, by the controller, so that the liquid droplet travels through the optical path to which the gradient is added; and
- detecting, by the controller, a deviation of a flying direction of the liquid droplet discharged from the nozzle based on an amount of the light received by the light-receiver in a case that the liquid droplet travels through the optical path.

The present disclosure brings about such an effect that it is possible to provide a printing apparatus, a discharge state detecting apparatus, and a discharge state detecting method which make it possible to detect a deviation of a flying direction of a liquid droplet discharged from a nozzle.

The foregoing object, the other objects, the feature, and the advantages of the present disclosure will be clarified from the following detailed description of embodiments with reference to accompanying drawings.

DESCRIPTION

Figure 1:
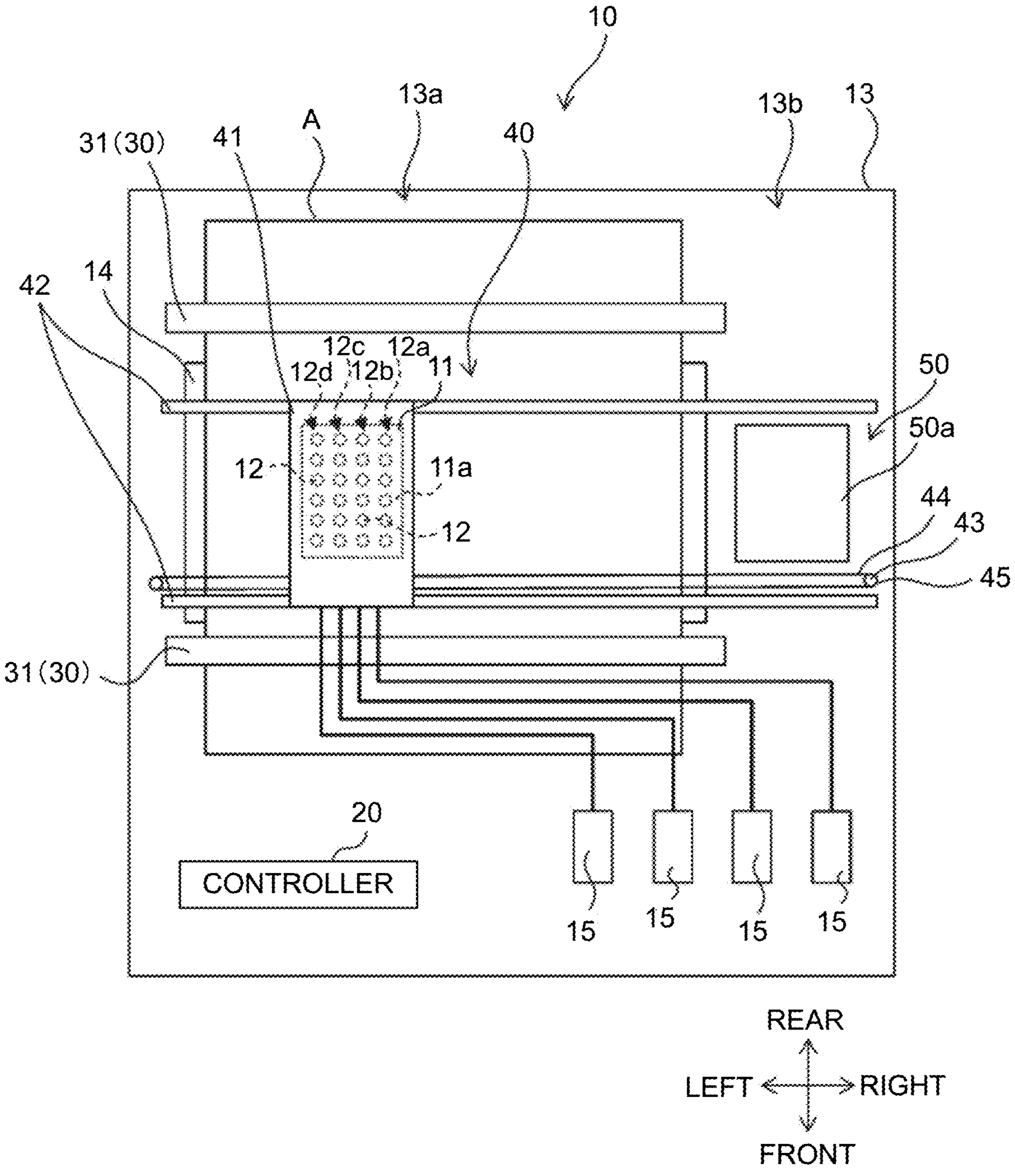
FIG. 1 is a schematic view depicting a printing apparatus.

As depicted in FIG. 1, a printing apparatus 10 according to an embodiment of the present disclosure is an apparatus which prints an image on a printing medium A by discharging ink droplets from nozzles 12 of a head 11 to the printing medium A. In the following description, an example will be explained, in which the printing apparatus 10 is applied to an ink-jet printer. However, the printing apparatus 10 is not limited to the ink-jet printer. Further, the printing medium A is, for example, a sheet of paper, cloth or the like.

The printing apparatus 10 is based on the serial head system. The printing apparatus 10 is provided with the head 11, a casing 13, a platen 14, tanks 15, a controller 20, a conveying device 30, a moving device 40, and a detecting unit 50. Note that the direction, in which the printing medium A is conveyed by the conveying device 30, is referred to as "front-rear direction". The direction, which intersects (for example, orthogonally crosses) the front-rear direction, is referred to as "left-right direction" in which the head 11 is to be moved by the moving device 40. Further, the direction, which intersects (for example, orthogonally crosses) the front-rear direction and the left-right direction, is referred to as "up-down direction". However, the directions, which relate to the printing apparatus 10, are not limited thereto. Further, the printing apparatus 10 may be based on the line head system. In this case, the printing apparatus 10 is not provided with the moving device 40. Further, the head 11 is not movable, and the head 11 has a dimension which is longer than the length of the printing medium A in the left-right direction.

A printing area 13*a* and a maintenance area 13*b* which is arranged on the right of the printing area 13*a* are provided in the casing 13. The platen 14 is arranged in the printing area 13*a*, and the detecting unit 50 is arranged in the maintenance area 13*b*. The platen 14 defines the distance, for example 2 mm, between the printing medium A which is arranged on the upper surface of the platen 14 and the head 11 which is provided facing the printing medium A.

The head 11 has a plurality of nozzles 12 (first nozzle, second nozzle). The nozzles 12 are open on a discharge surface 11*a* which is the lower surface of the head 11. The plurality of nozzles 12 is arranged or aligned in the front-rear direction to form the nozzle arrays. A first nozzle array 12*a*, a second nozzle array 12*b*, a third nozzle array 12*c*, and a fourth nozzle array 12*d* are arranged in this order from the right in the left-right direction. The nozzles 12 in one nozzle array are mutually communicated with the same tank 15. The different nozzle arrays are communicated with different tanks 15, respectively. Inks, which are stored in the tanks 15, are supplied to the nozzles 12.

Further, the head 11 is provided with driving elements 16 (FIG. 2) which are provided for the respective nozzles 12. The driving element 16 is, for example, a piezoelectric element, a heat generating element, or an electrostatic actuator. When the driving element 16 is driven, the driving element 16 thereby applies the pressure for discharging the ink droplets from the corresponding nozzle 12 to the ink contained in the head 11. Accordingly, the ink droplets are discharged from the nozzle 12.

Figure 2:
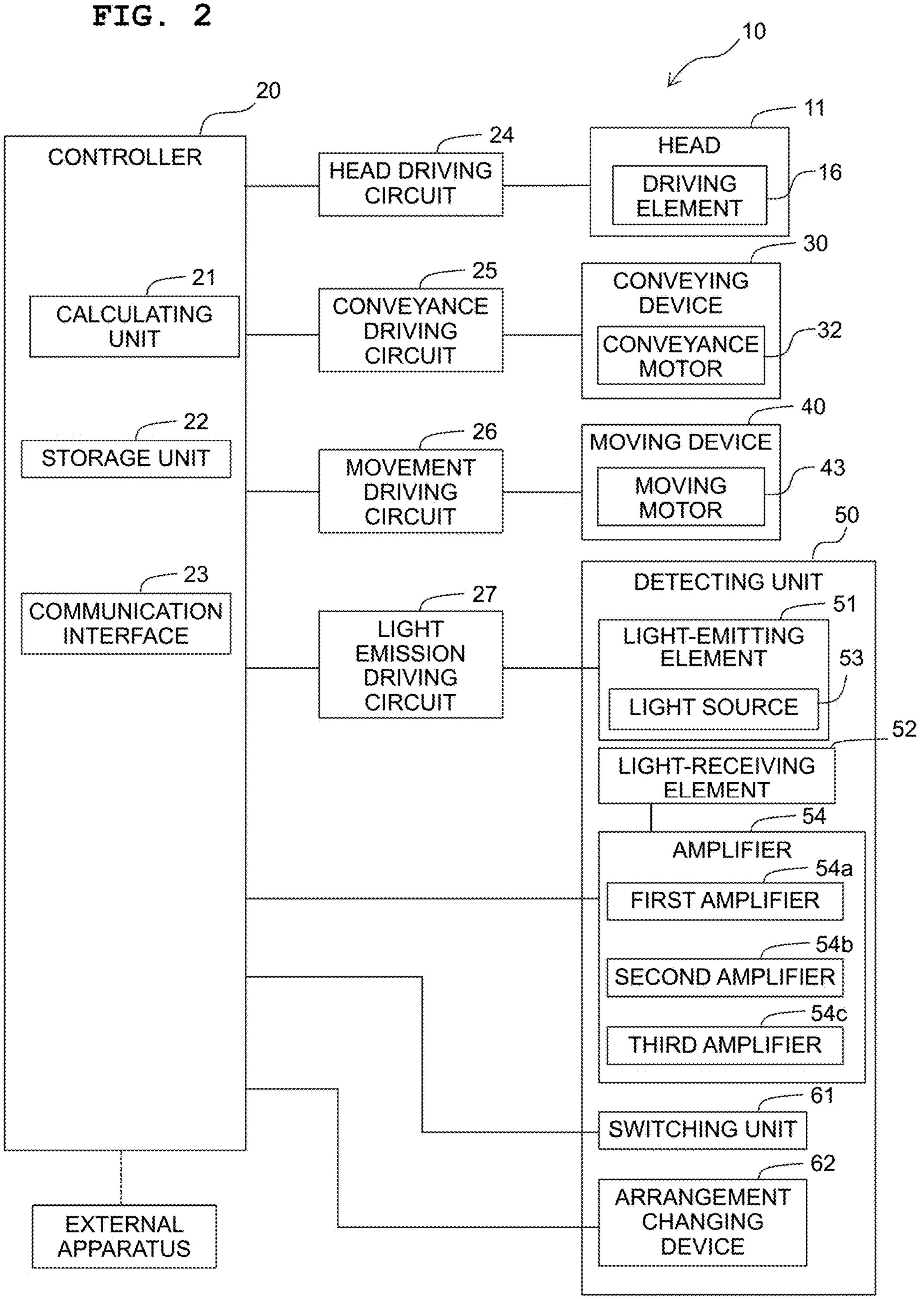
FIG. 2 is a functional block diagram of the printing apparatus depicted in FIG. 1.

The conveying device 30 has, for example, two conveying rollers 31 and a conveyance motor 32 (FIG. 2). The two conveying rollers 31 are arranged in the front-rear direction while interposing the platen 14 therebetween. The conveying roller 31 has a shaft which extends in the left-right direction, and the conveying roller 31 is connected to the conveyance motor 32. The conveying roller 31 is rotated about the center of the shaft in accordance with the driving of the conveyance motor 32 to convey the printing medium A in the front-rear direction on the platen 14 with respect to the head 11.

The moving device 40 has a carriage 41, two guide rails 42, a moving motor 43, and an endless belt 44. The carriage 41 carries the head 11, and the carriage 41 is supported by the two guide rails 42 movably in the left-right direction. The two guide rails 42 extend to range over the printing area 13*a* and the maintenance area 13*b* in the left-right direction so that the head 11 is interposed therebetween in the front-rear direction. The endless belt 44 extends in the left-right direction, and the endless belt 44 is attached to the carriage 41. Further, the endless belt 44 is attached to the moving motor 43 via pulleys 45. When the moving motor 43 is driven, then the endless belt 44 travels, and the carriage 41 reciprocatively moves in the left-right direction along the guide rails 42. Accordingly, the carriage 41 moves the head 11 in the left-right direction between the printing area 13*a* and the maintenance area 13*b*.

[Detecting Unit]

Figure 3A:
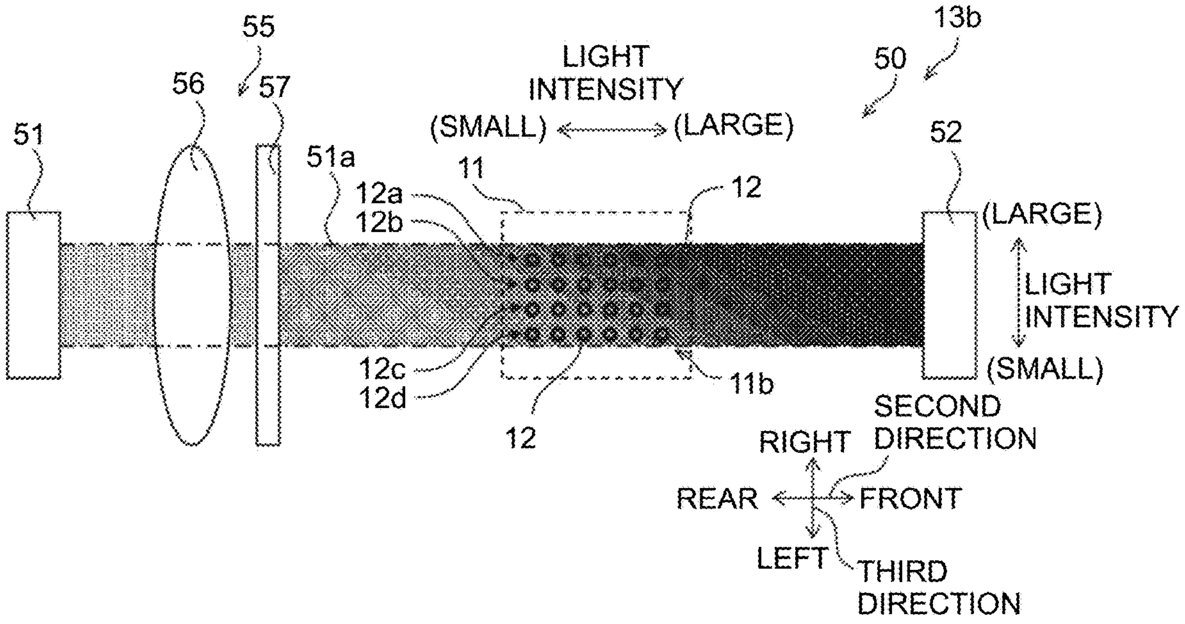
FIG. 3A is a schematic view of a detecting unit viewed from above.
Figure 3B:
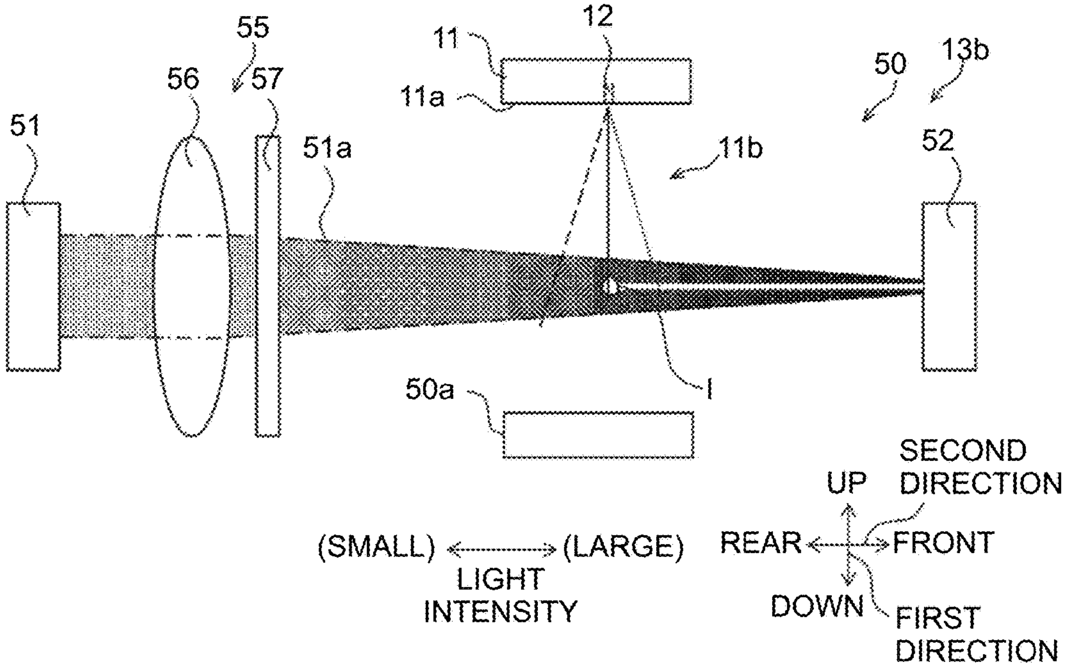
FIG. 3B is a schematic view of the detecting unit depicted in FIG. 3A viewed from left.

A receiving unit 50*a*, which receives the ink droplets discharged from the nozzles 12 of the head 11 arranged in the maintenance area 13*b*, is arranged in the detecting unit 50. Further, as depicted in FIG. 3A and FIG. 3B, the detecting unit 50 is provided with a light-emitting element (light-emitter) 51 which emits light, and a light-receiving element (light-receiver) 52 which receives the light emitted from the light-emitting element 51. Note that the first direction, in which the ink droplets I are discharged from the nozzles 12, is referred to as "up-down direction". The second direction, which intersects (for example, orthogonally crosses) the first direction, is referred to as "front-rear direction". The third direction, which intersects (for example, orthogonally crosses) both of the first direction and the second direction, is referred to as "left-right direction". However, the directions, which relate to the detecting unit 50, are not limited thereto.

The light-emitting element 51 has one or more light source 53 or light sources 53 including, for example, laser diodes and light-emitting diodes, and the light-emitting element 51 emits the light frontwardly. The light-emitting element 51 is arranged so that the optical path 51*a*, which is the route of the light emitted from the light-emitting element 51, is parallel to the front-rear direction. The optical path 51*a* is arranged between the discharge surface 11*a* of the head 11 and the receiving unit 50*a* in the up-down direction. For example, the light-emitting element 51 is arranged so that the optical path 51*a* is provided at the position of the distance of, for example, 3 to 4 mm from the discharge surface 11*a* in the up-down direction. The discharge surface 11*a* is parallel to the optical path 51*a* and orthogonal to the up-down direction. The flying area 11*b*, in which the ink droplet I discharged from the nozzle 12 opened on the discharge surface 11*a* flies, intersects the optical path 51*a* between the light-emitting element 51 and the light-receiving element 52. Accordingly, the ink droplet I is discharged downwardly from the nozzle 12, the ink droplet I passes through the optical path 51*a* during the period of flying in the flying area 11*b*, and the ink droplet I enters the receiving unit 50*a*.

The light-receiving element 52 is, for example, a photodiode or a phototransistor. The light-receiving element 52 is arranged opposingly to the light-emitting element 51, and the light-receiving element 52 receives the light emitted from the light-emitting element 51. The light-receiving element 52 is connected to an amplifier 54 (FIG. 2), and the amplifier 54 is connected to the controller 20 (FIG. 2). The light-receiving element 52 photoelectrically converts the received light to output, to the amplifier 54, a light-receiving signal which is an electric signal depending on the light-receiving amount of the light-receiving element 52 (that is, an amount of the light received by the light-receiving element 52). A light-receiving signal, which is obtained by amplifying the light-receiving signal at an arbitrary amplification factor of not less than 1, is outputted to the controller 20 by the amplifier 54. Then, the controller 20 detects the deviation of the flying direction of the ink droplet I discharged from the nozzle 12 on the basis of the light-receiving amount obtained by the light-receiving element 52. The detecting action will be described later on.

The printing apparatus 10 further comprises a gradient adding member (gradient adder, gradient applier) 55 which adds (applies) a gradient to the light intensity of the optical path 51*a* coming from the light-emitting element 51 in the respective directions of the left-right direction and the front-rear direction. The gradient adding member 55 is provided for the optical path 51*a* so that the light coming from the light-emitting element 51 passes through the gradient adding member 55. The gradient adding member 55 is arranged between the light-emitting element 51 and the flying area 11*b* in the front-rear direction. For example, the gradient adding member 55 includes a lens 56 for adding the gradient to the light intensity of the optical path 51*a* in the front-rear direction, and one optical filter 57 or a plurality of optical filters 57 of the absorption type or the reflection type for adding the gradient to the light intensity of the optical path 51*a* in the left-right direction.

Specifically, the lens 56 is, for example, a cylindrical lens. The lens 56 does not converge the light in the left-right direction, and the lens 56 converges the light so that the size of the light in the up-down direction is decreased at more frontward positions. Accordingly, the optical path 51*a*, which passes through the lens 56 in the front-rear direction, has the light intensity which is constant in the left-right direction and which is increased at positions separated frontwardly farther from the lens 56. In this manner, the gradient is added to the light intensity of the optical path 51*a* in the front-rear direction. The light intensity is, for example, the irradiance which is the radiation energy ($Wm^{-2}$) allowed to pass per unit time and per unit area. Note that as for the lens 56, the gradient may be added to the light intensity of the optical path 51*a* by means of the shape of the lens 56, or the gradient may be added to the light intensity of the optical path 51*a* by means of the coating of the lens 56.

The optical filter 57 has, for example, a rectangular flat plate-shaped form, and the optical filter 57 intersects (for example, orthogonally crosses) the front-rear direction. The optical filter 57 may be arranged between the lens 56 and the light-emitting element 51. Alternatively, the optical filter 57 may be arranged between the lens 56 and the flying area 11*b*. As for the optical filter 57, for example, the light transmittance is decreased at more leftward positions in the left-right direction. Therefore, the gradient, in which the light intensity is decreased at more leftward positions in the left-right direction, is added to the optical path 51*a* which passes through the optical filter 57. For example, as for the optical filter 57 of the light absorption type, the absorptance of the incoming light is increased at more leftward positions. Therefore, the gradient is added, in which the light intensity of the optical path 51*a* is decreased at more leftward positions. Further, as for the optical filter 57 of the light reflection type, the reflectance of the incoming light is increased at more leftward positions. Therefore, the gradient is added, in which the light intensity of the optical path 51*a* is decreased at more leftward positions.

Figure 4A:
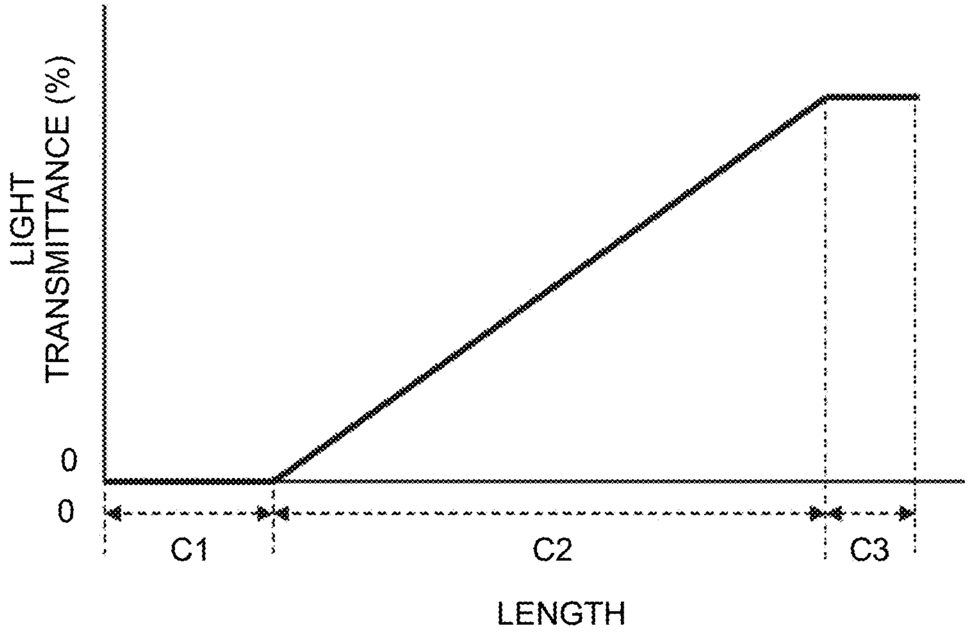
FIG. 4A is a graph illustrative of the transmittance of light which is changed continuously with respect to the length of an optical filter.
Figure 4B:
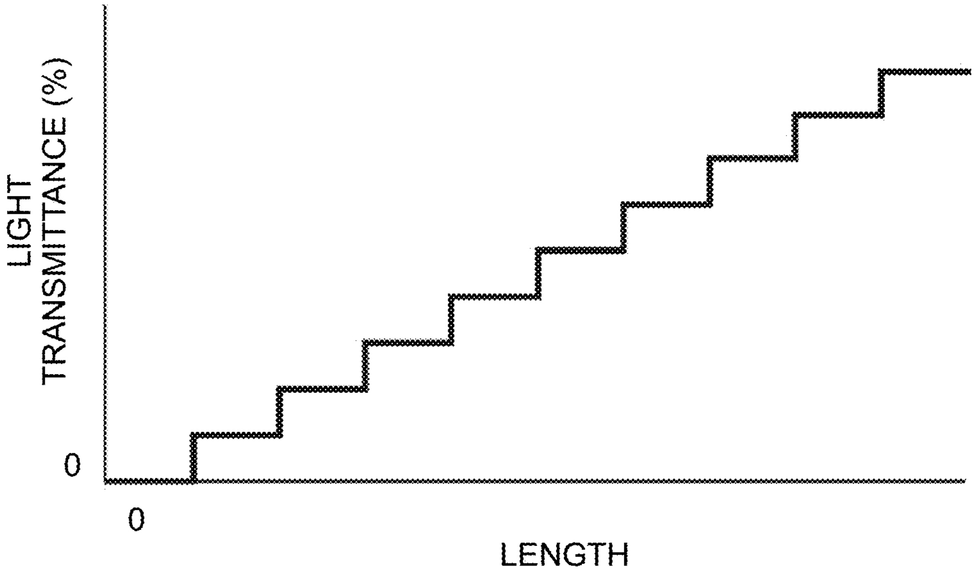
FIG. 4B is a graph illustrative of the transmittance of light which is changed in a stepwise manner with respect to the length of an optical filter.

As depicted in FIG. 4A, the light transmittance of the optical filter 57 may change to increase continuously at a constant rate as the length from the left end of the optical filter 57 is more increased in the left-right direction. Further, as depicted in FIG. 4B, the light transmittance of the optical filter 57 may change to increase in a stepwise manner as the length from the left end of the optical filter 57 is more increased in the left-right direction. Note that as depicted in FIG. 4A, when the optical filter 57 has portions C1, C3 in which the light transmittance is constant with respect to the length, the optical filter 57 is arranged so that the optical path 51*a* intersects a portion C2 in which the light transmittance changes with respect to (depending on) the length.

As depicted in FIG. 3A and FIG. 3B, as for the detecting unit 50 as described above, the light intensity of the optical path 51*a* is increased at more frontward positions in the front-rear direction owing to the lens 56, and the light intensity of the optical path 51*a* is decreased at more leftward positions in the left-right direction owing to the optical filter 57. In this manner, in the case of the optical path 51*a* in which the gradient is added to the light intensity, the light intensity differs depending on the position in the front-rear direction and the position in the left-right direction. Thus, the light intensity of the light interrupted by the ink droplet I differs depending on the flying direction of the ink droplet I discharged from the nozzle 12. Therefore, the light-receiving amount, of the light-receiving element 52, corresponding to the light intensity changes. On this account, the controller 20 can detect the deviation of the flying direction of the ink droplet I on the basis of the light-receiving amount. The detecting action will be described later on. Note that in this embodiment, the gradient of the light intensity change in the front-rear direction may be larger than or smaller than the gradient of the light intensity change in the left-right direction.

[Controller]

As depicted in the example in FIG. 2, the controller 20 is a computer which is provided with a calculating unit 21, a storage unit 22, and a communication interface 23. Note that the controller 20 may be constructed by a single device. Alternatively, the controller 20 may be constructed such that a plurality of devices is arranged in a dispersed manner, and the devices perform the action of the printing apparatus 10 in a cooperative manner. For example, the printing apparatus 10 may be provided with an information processing device such as a personal computer or the like and an output device capable of performing the printing, wherein the function of the controller 20 may be shared by the devices.

The communication interface 23 is a connecting device to be connected to an external apparatus by means of the wired communication or the wireless communication. The printing apparatus 10 transmits/receives the data such as the image data of an image to be printed or the like, to/from the external apparatus existing distinctly from the printing apparatus 10, by the aid of the communication interface 23. The storage unit 22 is a memory which is accessible from the calculating unit 21. The storage unit 22 has, for example, RAM and ROM. The storage unit 22 stores, for example, the image data as well as programs and data for executing various actions such as the printing action and the like.

The calculating unit 21 includes a processor such as CPU and circuits including, for example, an integrated circuit such as ASIC. The calculating unit 21 executes the program stored in the storage unit 22 while making reference to the data stored in the storage unit 22. Accordingly, the actions of the respective parts of the printing apparatus 10 are controlled by the controller 20 to execute various actions including, for example, the printing action and the detecting action.

Further, the controller 20 is connected to a head driving circuit 24, a conveyance driving circuit 25, and a movement driving circuit 26. The head driving circuit 24 is connected to the driving element 16 of the head 11, and the head driving circuit 24 drives the driving element 16 on the basis of the control signal brought about by the controller 20. Accordingly, the controller 20 discharges the ink droplet at a predetermined timing in a predetermined amount (size of the ink droplet I) from the nozzle 12. Further, the conveyance driving circuit 25 is connected to the conveyance motor 32. The conveyance driving circuit 25 drives the conveyance motor 32 on the basis of the control signal brought about by the controller 20. Accordingly, the controller 20 intermittently or continuously conveys the printing medium A on the platen 14 in the front-rear direction, and the controller 20 stops the printing medium A at a predetermined position on the platen 14. Further, the movement driving circuit 26 is connected to the moving motor 43. The movement driving circuit 26 drives the moving motor 43 on the basis of the control signal brought about by the controller 20. Accordingly, the controller 20 moves the carriage 41 which carries the head 11, at a variable speed in the left-right direction, and the controller 20 stops the carriage 41 at an arbitrary position within the movable range.

Further, the controller 20 is connected to a light emission driving circuit 27. The light emission driving circuit 27 is connected to the light source 53 of the light-emitting element 51, and the light emission driving circuit 27 drives the light source 53 on the basis of the control signal brought about by the controller 20. Accordingly, the controller 20 allows the light-emitting element 51 to emit the light having a predetermined light intensity therefrom.

[Printing Action]

In the printing apparatus 10 as described above, the controller 20 obtains the image data from the external apparatus to execute the printing action on the basis of the image data. For example, the controller 20 operates in the pass process such that the ink droplet I is discharged to the printing medium A on the platen 14 from the nozzle 12 of the head 11, while moving the head 11 rightwardly or leftwardly in the printing area 13*a*. Then, the controller 20 operates in the conveying process such that the printing medium A is conveyed frontwardly. In this manner, the printing apparatus 10 alternately repeats the pass process and the conveying process to progressively advance the printing action for printing the image on the printing medium A with the ink droplets I discharged from the nozzles 12 in the printing area 13*a*.

[Detecting Action]

Figure 5A:
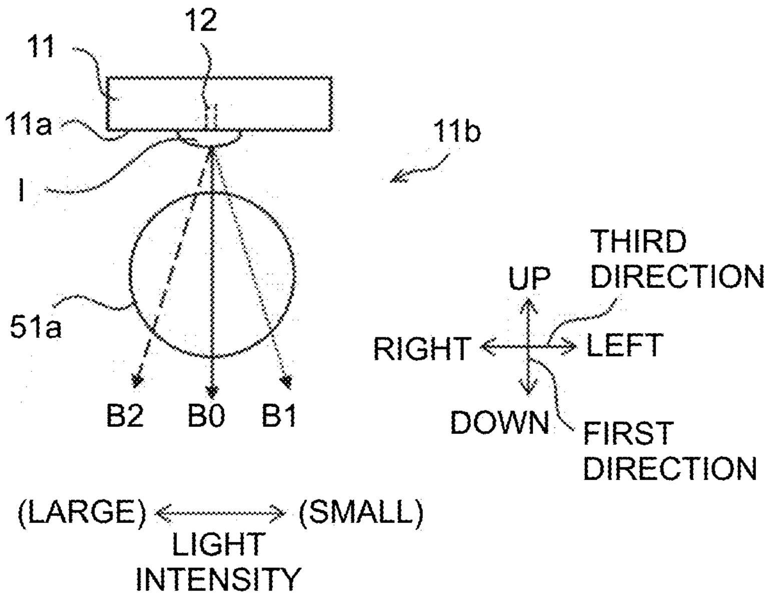
FIG. 5A depicts a relationship between the optical path and the flying direction of the ink droplet.

In this manner, the ink droplets I are discharged from the nozzles 12 in the printing action. For example, as depicted in FIG. 5A, when the nozzle 12 extends upwardly from the discharge surface 11$a$ of the head 11, the ink droplet I is discharged downwardly in the extending direction of the nozzle 12. As depicted by a solid line in FIG. 5A, the ink droplet I flies in the downward direction being the predetermined flying direction B0 along with the discharging direction. However, even when the ink droplet I is discharged downwardly from the nozzle 12, the flying direction of the ink droplet I is deviated in some cases from the predetermined flying direction B0 on account of, for example, the deposit around the nozzle 12 and/or the content of the ink. If the deviation arises in the flying direction as described above, then the landing position of the ink droplet I on the printing medium A is deviated from a desired position, and the image quality of the printed image is consequently deteriorated. In view of the above circumstances, the controller 20 executes the detecting action in which the detecting unit 50 detects the deviation of the flying direction of the ink droplet I discharged from the head 11 in the maintenance area 13$b$.

Specifically, as depicted in FIG. 3A and FIG. 3B, the light-emitting element 51 of the detecting unit 50 emits the light frontwardly, and the light passes through the lens 56 and the optical filter 57 of the gradient adding member 55. Accordingly, the gradient is added to the light intensity of the optical path 51$a$ so that the light intensity is increased at more frontward positions in the front-rear direction by means of the lens 56, and the light intensity is decreased at more leftward positions in the left-right direction by means of the optical filter 57. The light of the optical path 51$a$ passes through the flying area 11$b$ disposed downwardly from the head 11, and the light is received by the light-receiving element 52. The light-receiving signal, which depends on the light-receiving amount, is outputted by the light-receiving element 52 to the controller 20 (FIG. 2).

In this case, the controller 20 drives the driving element 16 (FIG. 2) so that a predetermined amount of the ink droplet I is discharged from the head 11 arranged over or above the receiving unit 50$a$ in the maintenance area 13$b$. If the ink droplet I is not discharged from the nozzle 12 in accordance with the driving of the driving element 16, then the light-receiving amount obtained by the light-receiving element 52 is not changed, and the light-receiving signal is not outputted to the controller 20. Therefore, the controller 20 determines that the discharge failure has been occurred.

On the other hand, if the ink droplet I is discharged from the nozzle 12 in accordance with the driving of the driving element 16, then the ink droplet I flies through the flying area 11$b$ from the head 11, and the ink droplet I passes through the optical path 51$a$ in the flying area 11$b$. The interruption of the optical path 51, which is caused by the ink droplet I, decreases the light-receiving amount to be obtained by the light-receiving element 52. Therefore, the light-receiving signal, which depends on the decrease in the light-receiving amount, is outputted to the controller 20. The controller 20 determines that the discharge has been occurred.

Further, the decrement of the light-receiving amount brought about by the light-receiving element 52 corresponds to the light intensity of the optical path 51$a$ interrupted by the ink droplet I. The light intensity of the optical path 51$a$ is added with the gradients in the respective directions of the front-rear direction and the left-right direction. Therefore, the decrement of the light-receiving amount corresponds to the flying direction of the ink droplet I. Thus, the controller 20 can detect the deviation of the flying direction of the ink droplet I with respect to the predetermined flying direction B0 depending on the decrement of the light-receiving amount.

Figure 5B:
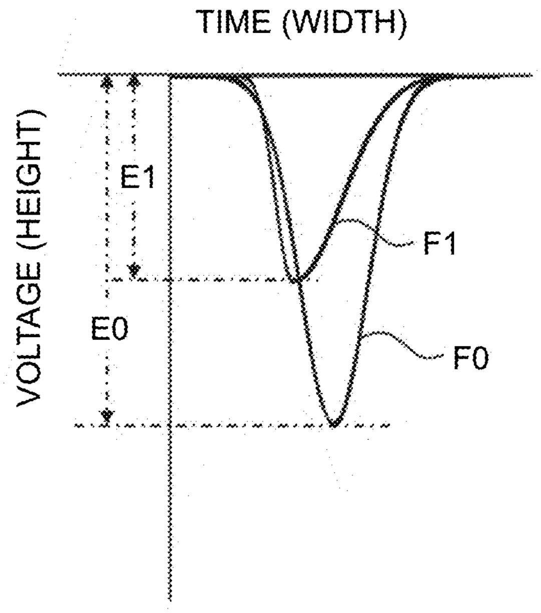
FIG. 5B depicts light-receiving signals obtained when the ink droplet flies from the nozzle in each of the directions B0 and B1.
Figure 5C:
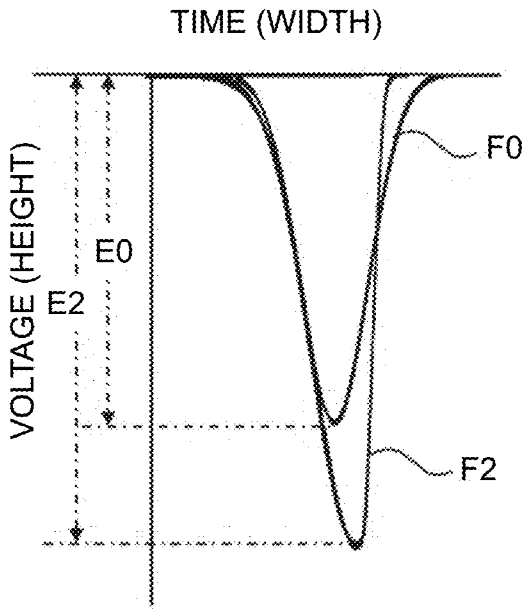
FIG. 5C depicts light-receiving signals obtained when the ink droplet flies from the nozzle in each of the directions B0 and B2.

That is, FIG. 5A schematically depicts the flying direction of the ink droplet I discharged from the nozzle 12. The decrease in the light-receiving amount of the light-receiving element 52, which depends on the interruption of the optical path 51$a$ caused by the ink droplet I, is outputted from the light-receiving element 52 as the light-receiving signal which is the signal corresponding to the light-receiving amount. FIG. 5B and FIG. 5C are graphs of the light-receiving signal outputted by the light-receiving element 52, wherein the vertical axis represents the voltage of the light-receiving signal, and the horizontal axis represents the time. As for the waveform of the light-receiving signal (an example of "waveform signal"), the light-receiving amount is represented by the height (voltage) of the light-receiving signal, and the elapsed time is represented by the width of the light-receiving signal. The larger the light intensity of the optical path 51$a$ interrupted by the ink droplet I is, the larger the decrement of the light-receiving amount of the light-receiving element 52 is. Therefore, the height of the light-receiving signal is increased in relation thereto.

As depicted by the solid line in FIG. 5A, when the ink droplet I flies from the nozzle 12 in the downward direction which is the predetermined flying direction B0, then the light-receiving amount is decreased by a predetermined amount as depicted by the light-receiving signal F0 in FIG. 5B and FIG. 5C, and the light-receiving signal has the height E0 of the peak which is the minimum value of the voltage. On the contrary, for example, as depicted by a dotted line in FIG. 5A, when the ink droplet I flies from the nozzle 12 in the leftward direction B1 as compared with the predetermined flying direction B0, since the light intensity of the optical path 51$a$ is decreased at more leftward positions, as depicted by the light-receiving signal F1 in FIG. 5B, the decrement of the light-receiving amount is smaller than the predetermined amount. The height E1 of the peak of the light-receiving signal F1 is smaller than the height E0 of the peak of the light-receiving signal F0. On the other hand, as depicted by a broken line in FIG. 5A, when the ink droplet I flies from the nozzle 12 in the rightward direction B2 as compared with the predetermined flying direction B0, since the light intensity of the optical path 51$a$ is increased at more rightward positions, as depicted by the light-receiving signal F2 in FIG. 5C, the decrement of the light-receiving amount is larger than the predetermined amount. The height E2 of the peak of the light-receiving signal F2 is larger than the height E0 of the peak of the light-receiving signal F0.

Further, as depicted in FIG. 3B, the gradient is added to the light intensity of the optical path 51$a$ so that the light intensity is increased at more frontward positions in the front-rear direction. On this account, in the same manner as described above, when the ink droplet I flies from the nozzle 12 in the rearward direction as compared with the predetermined flying direction B0, since the light intensity of the optical path 51$a$ is decreased at more rearward positions, in the same manner as the light-receiving signal F1 depicted in FIG. 5B, the height of the peak of the light-receiving signal is smaller than the height E0 of the peak of the light-receiving signal F0. On the other hand, when the ink droplet I flies from the nozzle 12 in the frontward direction as compared with the predetermined flying direction B0, since the light intensity of the optical path 51$a$ is increased at more frontward positions, in the same manner as the light-receiving signal F2 depicted in FIG. 5C, the height of the peak of the light-receiving signal is larger than the height E0 of the peak of the light-receiving signal F0.

In this manner, the controller 20 can detect the presence or absence of the discharge of the ink droplet I on the basis of the presence or absence of the light-receiving signal outputted by the light-receiving element 52. Further, the controller 20 can detect the deviation of the flying direction of the ink droplet I with respect to the predetermined flying direction B0 in each of the front-rear direction and the left-right direction depending on the height of the light-receiving signal. In this embodiment (and in each of the following modified embodiments), as described above, the gradient of the light intensity change in the front-rear direction may be different from the gradient of the light intensity change in the left-right direction. Therefore, it is possible to distinguish the situation in which the deviation of the flying direction of the ink droplet I occurs in the front-rear direction from the situation in which the deviation occurs in the left-right direction, on the basis of the magnitude of the change amount of the light-receiving signal. Further, the combination of the lens 56 and the optical filter 57 is used as the gradient adding member 55 for the detecting action. Accordingly, it is possible to perform the detecting action inexpensively without using any special optical part.

First Modified Embodiment

A printing apparatus 10 according to a first modified embodiment is configured as follow. That is, in the embodiment described above, as depicted in FIG. 6A and FIG. 6B, the gradient adding member 55 includes a lens 56*a* having an asymmetrical shape which adds the gradient to the light intensity of the optical path 51*a* in both of the front-rear direction and the left-right direction.

Specifically, the lens 56*a* intersects the optical path 51*a* so that the light, which is emitted frontwardly from the light-emitting element 51, passes through the lens 56*a* at a position between the light-emitting element 51 and the flying area 11*b*. The lens 56*a* may be one lens or a combination of a plurality of lenses provided that the lens 56*a* can add the gradient of the light intensity in the respective directions of the front-rear direction and the left-right direction.

The lens 56*a* having the asymmetrical shape is, for example, a free-form surface lens, and has a shape in which the radius of curvature is not constant and which has a plurality of radiuses of curvature, with respect to the surface which is orthogonal to at least one direction of the front-rear direction, the left-right direction, and the up-down direction. The lens 56*a* has, for example, a cross-sectional shape which is orthogonal to the left-right direction as depicted in FIG. 6C, and extends in the left-right direction. For example, the front surface of the lens 56*a* may be a curved surface which is curved in the front-rear direction along with the up-down direction so that the front surface of the lens 56*a* has a plurality of radiuses of curvature.

Figure 6A:
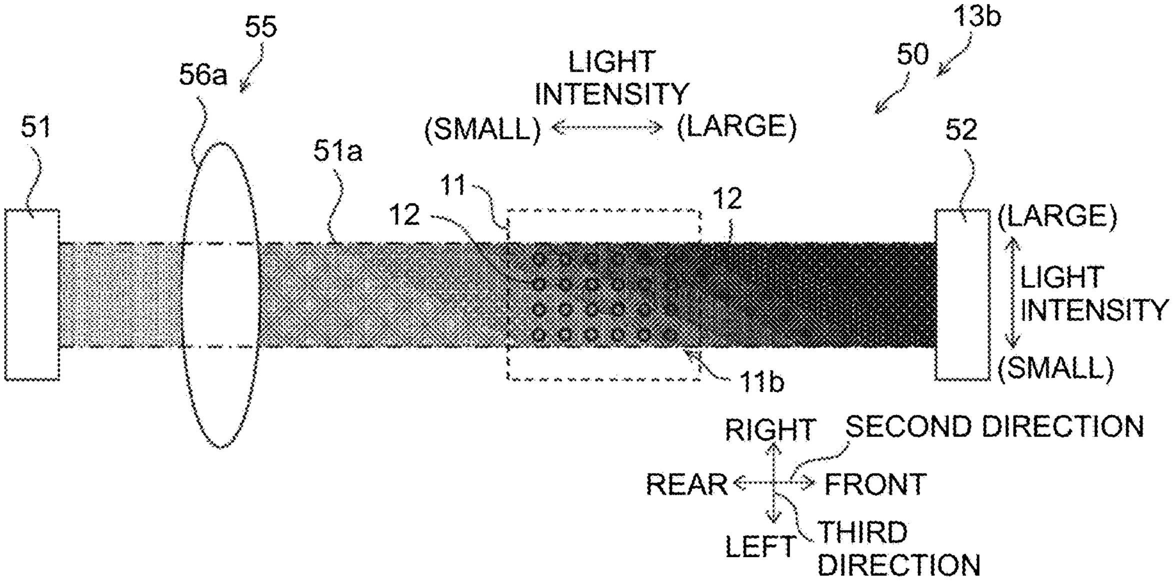
FIG. 6A is a schematic view of a detecting unit, in a printing apparatus, viewed from above.
Figure 6B:
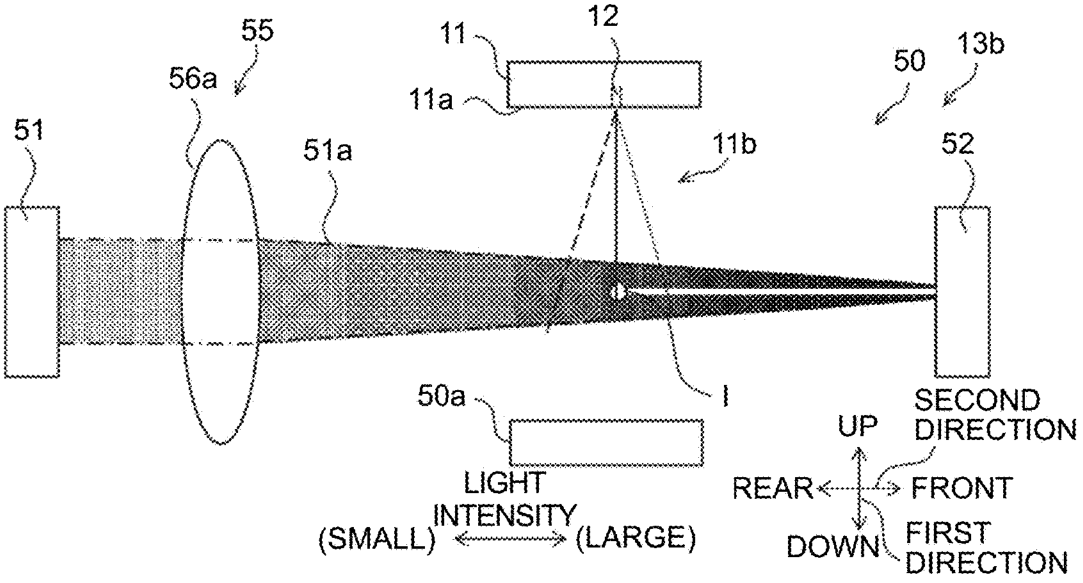
FIG. 6B is a schematic view of the detecting unit depicted in FIG. 6A viewed from left.
Figure 6C:
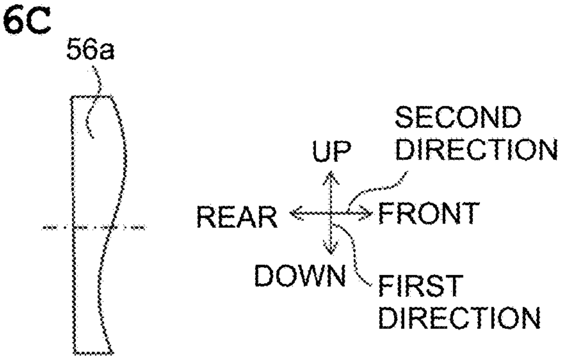
FIG. 6C depicts an exemplary lens.

In the exemplary case depicted in FIG. 6A and FIG. 6B, the lens 56*a* adds the gradient to the light intensity of the optical path 51*a* such that the light intensity is increased at more frontward positions in the front-rear direction and the light intensity is decreased at more leftward positions in the left-right direction. The controller 20 drives the driving element 16 so that a predetermined amount of the ink droplet I is discharged from the head 11 which is arranged over or above the optical path 51*a*. The controller 20 can detect the presence or absence of the discharge of the ink droplet I in accordance with the driving, on the basis of the presence or absence of the light-receiving signal outputted by the light-receiving element 52. Further, the controller 20 can detect the deviation of the flying direction of the ink droplet I with respect to the predetermined flying direction B0 in the respective directions of the front-rear direction and the left-right direction, depending on the height of the light-receiving signal outputted by the light-receiving element 52. Further, the lens 56*a* is used as the gradient adding member 55 for the detecting action, and thus it is possible to suppress the number of parts so that the number is small.

Second Modified Embodiment

A printing apparatus 10 according to a second modified embodiment is configured as follows. That is, in the embodiment described above, as depicted in FIG. 7A and FIG. 7B, the gradient adding member 55 includes a lens 56 which adds the gradient to the light intensity of the optical path 51*a* in the front-rear direction, and a frame member 58 which includes an opening 58*a* for allowing a part of the light emitted from the light-emitting element 51 to pass therethrough so that the light intensity of the optical path 51*a* has the gradient in the left-right direction.

Specifically, the lens 56 is configured, for example, in the same manner as the lens 56 depicted in FIG. 3B. The light is not converged in the left-right direction, and the light is converged so that the dimension in the up-down direction is decreased at more frontward positions. Accordingly, the lens 56 adds the gradient to the light intensity of the optical path 51*a* in the front-rear direction so that the light intensity is increased at more frontward positions.

Figure 7A:
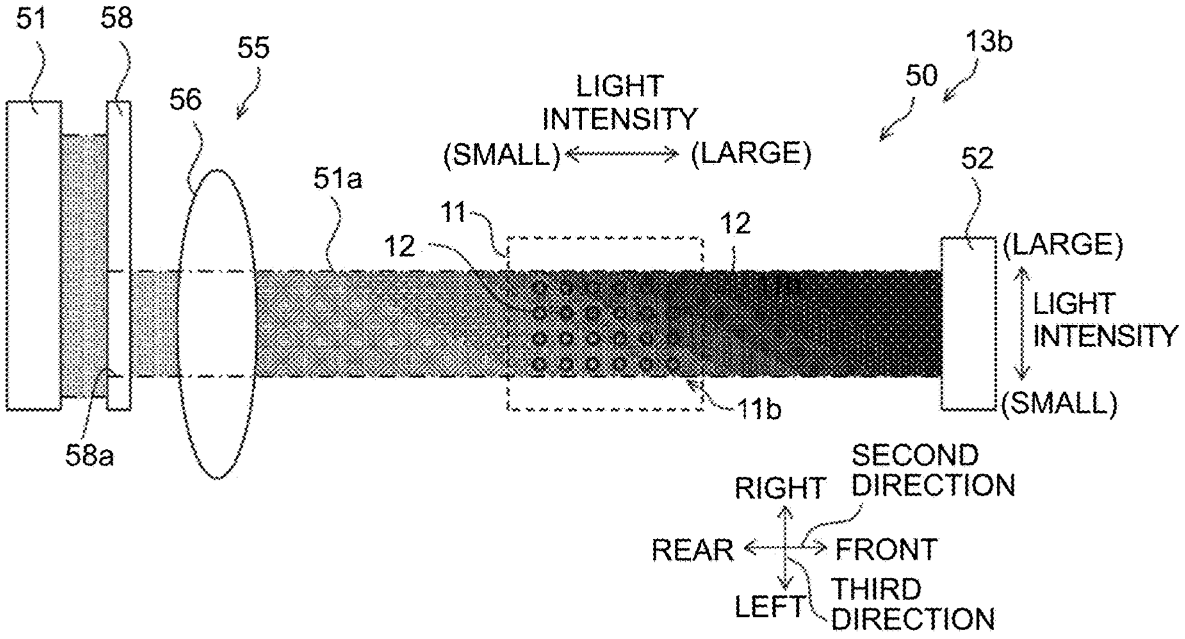
FIG. 7A is a schematic view of a detecting unit, in a printing apparatus, viewed from above.
Figure 7B:
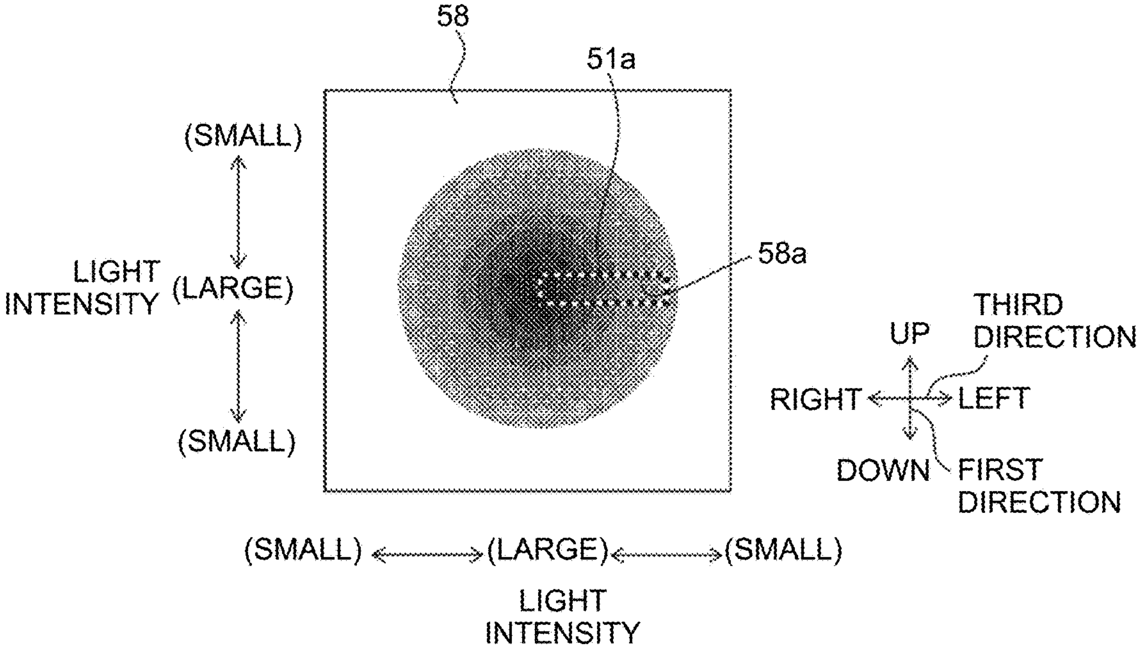
FIG. 7B is a schematic view of a frame member of the detecting unit depicted in FIG. 7A viewed from rear.

As depicted in FIG. 7A and FIG. 7B, the frame member 58 has, for example, a flat plate shape. The frame member 58 is arranged so that the frame member 58 is orthogonal to the front-rear direction at a position between the light-emitting element 51 and the lens 56 in the front-rear direction. The frame member 58 has the opening 58*a* having a rectangular shape. The frame member 58 is constructed such that a part of the light is allowed to pass through the opening 58*a*, and a part or all of the other light is blocked or interrupted so that the light does not come into the lens 56 and the light-receiving element 52. In relation to the smaller dimension D of the dimensions of the opening 58*a* in the up-down direction and the left-right direction and the wavelength λ of the light emitted by the light-emitting element 51, the opening 58*a* has such a dimension that A/D is sufficiently small so that the diffraction of the light allowed to pass through the opening 58*a* hardly occurs. Accordingly, the light, which passes through the opening 58*a*, goes straight ahead. Note that the shape of the opening 58*a* is not limited to the rectangular shape, which may be, for example, circular, elliptic, and triangular shapes.

The light, which is emitted frontwardly from the light-emitting element 51, has the light intensity which is increased at positions nearer to the center in a circular cross section that is orthogonal to the front-rear direction. On the contrary, the right end of the opening 58*a* is positioned at the center of the light or at a position deviated leftwardly from the center. The opening 58*a* extends in the left-right direction. On this account, the light intensity of the light allowed to pass through the opening 58*a* is decreased at more leftward positions. In this manner, the frame member 58 selects and extracts (splices out) the part of the light coming from the light-emitting element 51 by means of the opening 58*a*. Thus, the gradient is added to the light intensity in the left-right direction in relation to the optical path 58*a* of the light allowed to pass through the opening 58*a*.

In this manner, the gradient is added to the light intensity of the optical path 51*a* so that the light intensity is increased at more frontward positions in the front-rear direction by means of the lens 56, and the light intensity is decreased at more leftward positions in the left-right direction by means of the frame member 58 having the opening 58*a*. The controller 20 drives the driving element 16 so that the ink droplet I in the predetermined amount is discharged by the head 11 which is arranged over or above the optical path 51*a*. The controller 20 can detect the presence or absence of the discharge of the ink droplet I in accordance with the driving on the basis of the presence or absence of the light-receiving signal outputted by the light-receiving element 52. Further, the controller 20 can detect the deviation of the flying direction of the ink droplet I with respect to the predetermined flying direction B0 in the respective directions of the front-rear direction and the left-right direction, depending on the height of the light-receiving signal. Further, the frame member 58, which has the opening 58*a*, is used as the gradient adding member 55 for the detecting action. Thus, it is possible to suppress the cost and the size of the printing apparatus 10.

Third Modified Embodiment

Figure 8A:
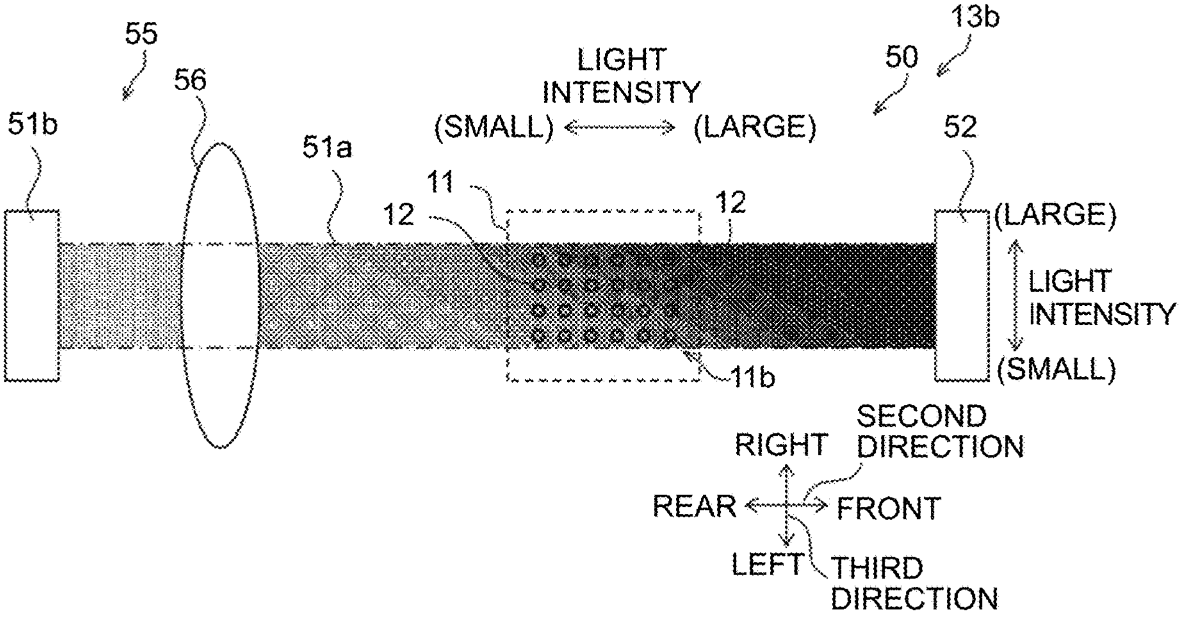
FIG. 8A is a schematic view of a detecting unit, in a printing apparatus, viewed from above.
Figure 8B:
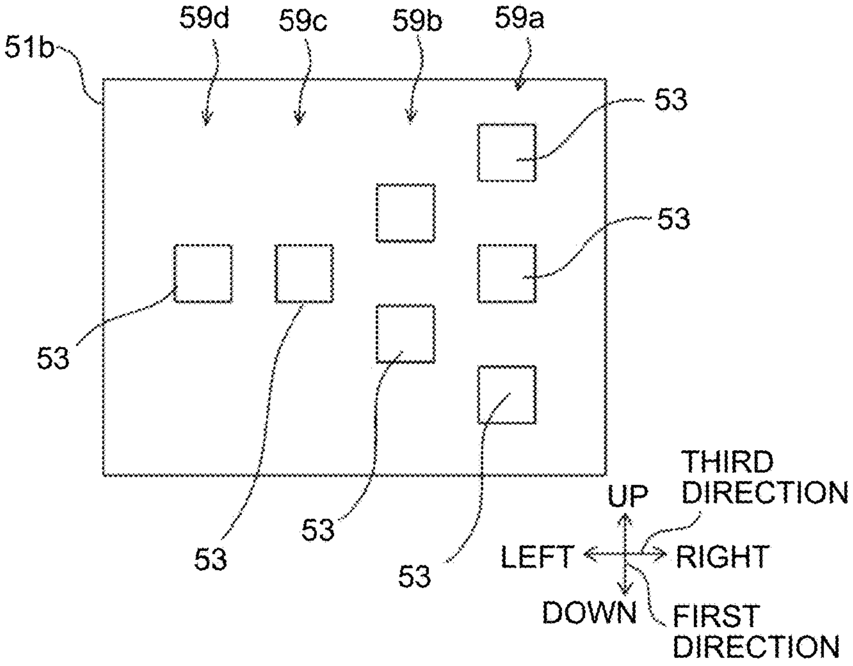
FIG. 8B is a schematic view of a light-emitting element of the detecting unit depicted in FIG. 8A viewed from front.

A printing apparatus 10 according to a third modified embodiment is configured as follows. That is, in the embodiment described above, as depicted in FIG. 8A and FIG. 8B, the gradient adding member 55 includes a lens 56 which adds the gradient to the light intensity of the optical path 51*a* in the front-rear direction. A light-emitting element 51*b* has a plurality of light sources 53 which are arranged in a plurality of areas. Further, the number of the arranged light source 53 or light sources 53 differs between one area and the other area in the left-right direction of the plurality of areas.

Specifically, the lens 56 is the same as or equivalent to, for example, the lens 56 depicted in FIG. 3B. The light is not converged in the left-right direction, and the light is converged so that the dimension in the up-down direction is decreased at more frontward positions. Accordingly, the lens 56 adds the gradient to the light intensity of the optical path 51*a* in the front-rear direction so that the light intensity is increased at more frontward positions.

The light-emitting element 51*b* has the plurality of areas (for example, a first area 59*a* to a fourth area 59*d*). The first area 59*a*, the second area 59*b*, the third area 59*c*, and the fourth area 59*d* are arranged in this order from the right in the left-right direction. Three light sources 53 are provided in the first area 59*a*, two light sources 53 are provided in the second area 59*b*, and one light source 53 is provided in each of the areas of the third area 59*c* and the fourth area 59*d*. The plurality of light sources 53 are arranged or aligned in the up-down direction in the respective areas of the first area 59*a* and the second area 59*b*.

In this manner, as for the light-emitting element 51*b*, the second area 59*b* has the light sources 53 of the number which is larger than those of the third area 59*c* and the fourth area 59*d*, and the first area 59*a* has the light sources 53 of the number which is larger than that of the second area 59*b*. On this account, the number of the light sources 53 is decreased at more leftward positions in the left-right direction in the light-emitting element 51*b*. The light sources 53 mutually emit the light having the same light intensity. Accordingly, the light intensity of the light emitted by the light-emitting element 51*b* is decreased at more leftward positions. Therefore, the gradient is provided such that the light intensity of the optical path 51*a* brought about by the light-emitting elements 51*b* is also decreased at more leftward positions. On this account, the light-emitting element 51*b* is used as the gradient adding member 55 which adds the gradient to the light intensity of the optical path 51*a* in the left-right direction. Note that the light intensity of the light emitted by the light source 53 is the irradiance.

In this manner, the gradient is added to the light intensity of the optical path 51*a* so that the light intensity is increased at more frontward positions in the front-rear direction by means of the lens 56, and the light intensity is decreased at more leftward positions in the left-right direction by means of the light-emitting element 51*b*. The controller 20 drives the driving element 16 so that a predetermined amount of the ink droplet I is discharged from the head 11 which is arranged over or above the optical path 51*a*. The controller 20 can detect the presence or absence of the discharge of the ink droplet I in accordance with the driving on the basis of the presence or absence of the light-receiving signal outputted by the light-receiving element 52. Further, the controller 20 can detect the deviation of the flying direction of the ink droplet I with respect to the predetermined flying direction B0 in each of the directions of the front-rear direction and the left-right direction depending on the height of the light-receiving signal outputted by the light-receiving element 52. Further, the light-emitting element 51*b* is used as the gradient adding member 55 for the detecting action, and thus the number of parts is small. Therefore, it is possible to suppress the cost and the size of the printing apparatus 10, and it is possible to mitigate requirement regarding the arrangement accuracy of the parts for the detecting action.

Fourth Modified Embodiment

A printing apparatus 10 according to a fourth modified embodiment is configured as follows. That is, in the embodiment described above, as depicted in FIG. 9A and FIG. 9B, the gradient adding member 55 includes a lens 56 which adds the gradient to the light intensity of the optical path 51*a* in the front-rear direction. A light-emitting element 51*c* has a plurality of light sources 53 which are arranged in a plurality of areas. Further, the light intensity differs between the light coming from the light source 53 arranged in one area in the left-right direction of the plurality of areas and the light coming from the light source 53 arranged in the other area in the left-right direction.

Specifically, the lens 56 is the same as or equivalent to, for example, the lens 56 depicted in FIG. 3B. The light is not converged in the left-right direction, and the light is converged so that the dimension in the up-down direction is decreased at more frontward positions. Accordingly, the lens 56 adds the gradient to the light intensity of the optical path 51*a* in the front-rear direction so that the light intensity is increased at more frontward positions.

The light-emitting element 51*c* has the plurality of areas (for example, a fifth area 59*e* to an eighth area 59*h*). The fifth area 59*e*, the sixth area 59*f*, the seventh area 59*g*, and the eighth area 59*h* are arranged in this order from the right in the left-right direction. The plurality of (for example, three) light sources 53 are provided in each of the areas of the fifth area 59*e* to the eighth area 59*h*. The plurality of light sources 53 in each of the areas are arranged or aligned in the up-down direction.

The light intensity of the light emitted by each of the light sources 53 is variable, and the light intensity is controlled by the controller 20. In this case, the light intensity is controlled by the controller 20 so that the light intensity of the light emitted by the light source 53 is decreased in an order of the light sources 53 in the fifth area 59*e*, the light sources 53 in the sixth area 59*f*, the light sources 53 in the seventh area

59*g*, and the light sources 53 in the eighth area 59*h*. Accordingly, the light intensity of the light emitted by the light-emitting element 51*c* is decreased at more leftward positions. Therefore, the gradient is provided such that the light intensity of the optical path 51*a* brought about by the light-emitting element 51*c* is also decreased at more leftward positions. On this account, the light-emitting element 51*c* is used as the gradient adding member 55 which adds the gradient to the light intensity of the optical path 51*a* in the left-right direction.

In this manner, the gradient is added to the light intensity of the optical path 51*a* so that the light intensity is increased at more frontward positions in the front-rear direction by means of the lens 56, and the light intensity is decreased at more leftward positions in the left-right direction by means of the light-emitting element 51*c*. The controller 20 drives the driving element 16 so that a predetermined amount of the ink droplet I is discharged from the head 11 which is arranged over or above the optical path 51*a*. The controller 20 can detect the presence or absence of the discharge of the ink droplet I in accordance with the driving on the basis of the presence or absence of the light-receiving signal outputted by the light-receiving element 52. Further, the controller 20 can detect the deviation of the flying direction of the ink droplet I with respect to the predetermined flying direction B0 in each of the directions of the front-rear direction and the left-right direction depending on the height of the light-receiving signal outputted by the light-receiving element 52. Further, the light-emitting element 51*c* is used as the gradient adding member 55 for the detecting action, and thus the number of parts is small. Therefore, it is possible to suppress the cost and the size of the printing apparatus 10, and it is possible to mitigate requirement regarding the arrangement accuracy of the parts for the detecting action.

Fifth Modified Embodiment

A printing apparatus 10 according to a fifth modified embodiment is configured as follows. That is, in the embodiment described above, as depicted in FIG. 10A and FIG. 10B, the gradient adding member 55 includes a lens 56 which adds the gradient to the light intensity of the optical path 51*a* in the front-rear direction, and a concave mirror 60 which has a curved surface 60*a* for reflecting the light emitted from the light-emitting element 51 and which adds the gradient to the light intensity of the optical path 51*a* in the left-right direction.

Specifically, the lens 56 is the same as or equivalent to, for example, the lens 56 depicted in FIG. 3B. The light is not converged in the left-right direction, and the light is converged so that the dimension in the up-down direction is decreased at more frontward positions. Accordingly, the lens 56 adds the gradient to the light intensity of the optical path 51*a* in the front-rear direction so that the light intensity is increased at more frontward positions.

The concave mirror 60 is arranged at the right of the light-emitting element 51 and at the rear of the lens 56. The light-emitting element 51 emits the light rightwardly. The light is reflected by the curved surface 60*a* of the concave mirror 60. The light successively passes through the lens 56 and the flying area 11*b*, and the light is received by the light-receiving element 52. The curved surface 60*a* of the concave mirror 60 is a reflecting surface for reflecting the light coming from the light-emitting element 51. The curved surface 60*a* is curved in a curved line form in a cross section orthogonal to the up-down direction, and the curved surface 60*a* extends in a straight line form in a cross section parallel to the up-down direction. The curved surface 60*a*, which is curved as described above, has the curvature which changes so that the curvature is increased at more rightward positions in the left-right direction. The rate of change of the curvature is increased at more rightward positions in the left-right direction. On this account, the optical path 51*a* of the light reflected by the curved surface 60*a* has the gradient in which the light intensity is increased at more leftward positions.

In this manner, the gradient is added to the light intensity of the optical path 51*a* so that the light intensity is increased at more frontward positions in the front-rear direction by means of the lens 56 and the light intensity is increased at more leftward positions in the left-right direction by means of the concave mirror 60. The controller 20 drives the driving element 16 so that a predetermined amount of the ink droplet I is discharged from the head 11 which is arranged over or above the optical path 51*a*. The controller 20 can detect the presence or absence of the discharge of the ink droplet I in accordance with the driving on the basis of the presence or absence of the light-receiving signal outputted by the light-receiving element 52. Further, the controller 20 can detect the deviation of the flying direction of the ink droplet I with respect to the predetermined flying direction B0 in each of the directions of the front-rear direction and the left-right direction depending on the height of the light-receiving signal outputted by the light-receiving element 52.

Figure 10A:
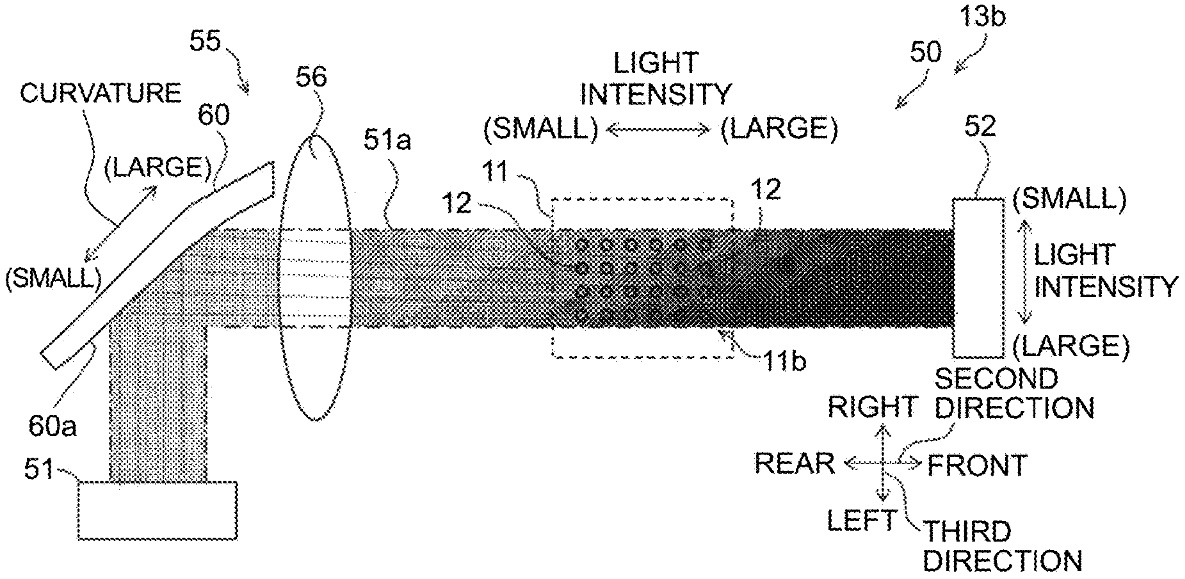
FIG. 10A is a schematic view of a detecting unit, in a printing apparatus, viewed from above.
Figure 10B:
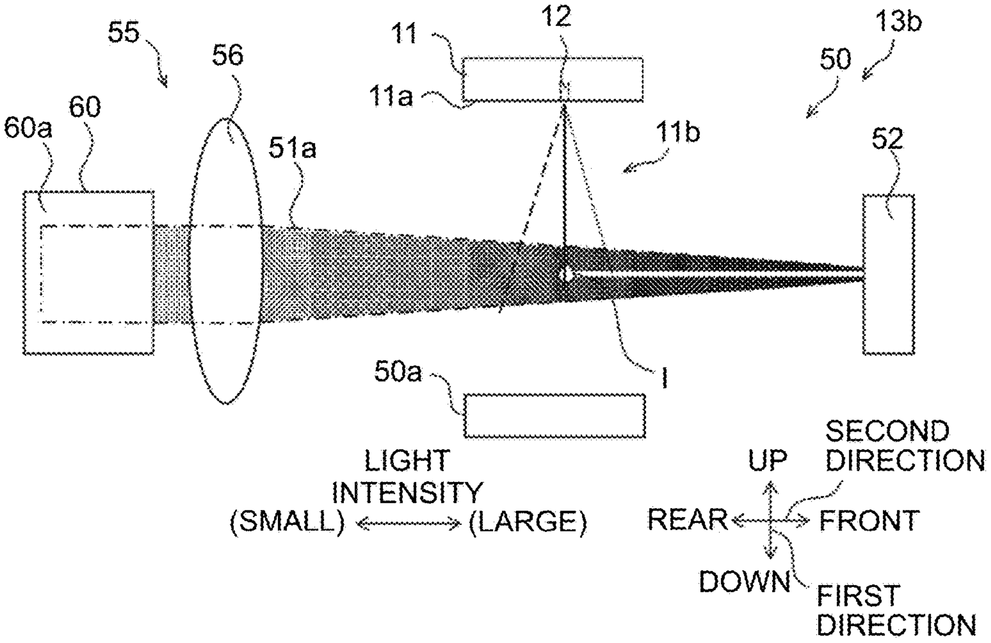
FIG. 10B is a schematic view of the detecting unit depicted in FIG. 10A viewed from left.
Figure 11:
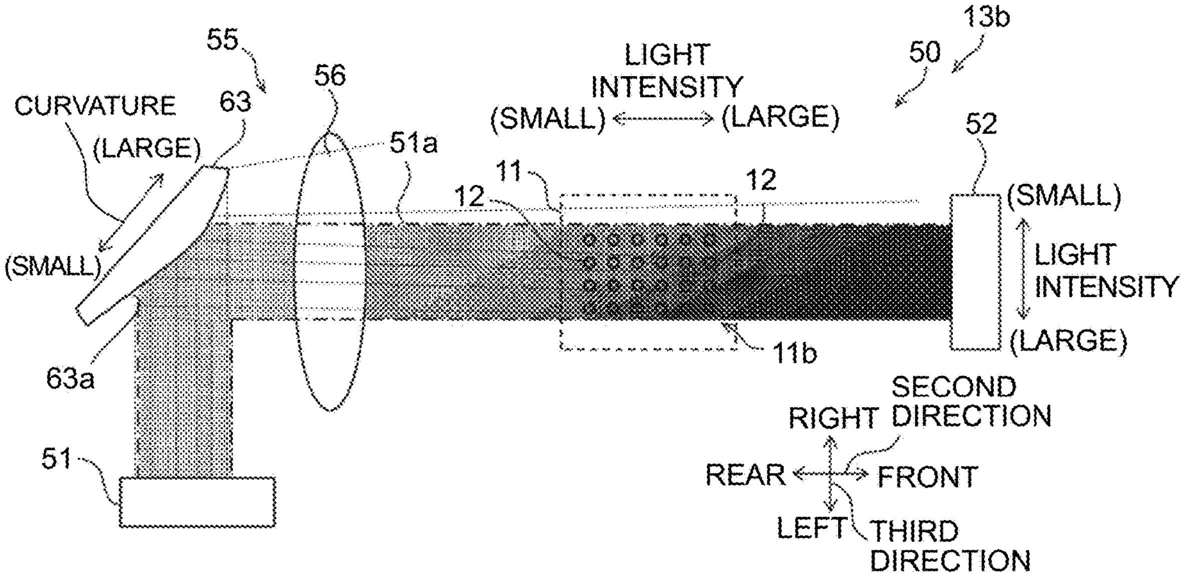
FIG. 11 is a schematic view of a detecting unit viewed from above, in a case that a convex mirror is used for a gradient adding member in the printing apparatus.

Note that in FIG. 10A and FIG. 10B, the concave mirror 60 is used for the gradient adding member 55. However, as depicted in FIG. 11, a convex mirror 63 may be used for the gradient adding member 55. The convex mirror 63 has a curved surface 63*a* which is curved in a curved line form in a cross section orthogonal to the up-down direction and which extends in a straight line form in a cross section parallel to the up-down direction. The curved surface 63*a*, which is curved as described above, has the curvature which changes so that the curvature is increased at more rightward positions in the left-right direction. The rate of change of the curvature is increased at more rightward positions in the left-right direction. On this account, the optical path 51*a* of the light reflected by the curved surface 60*a* has the gradient in which the light intensity is increased at more leftward positions.

Sixth Modified Embodiment

Figure 12A:
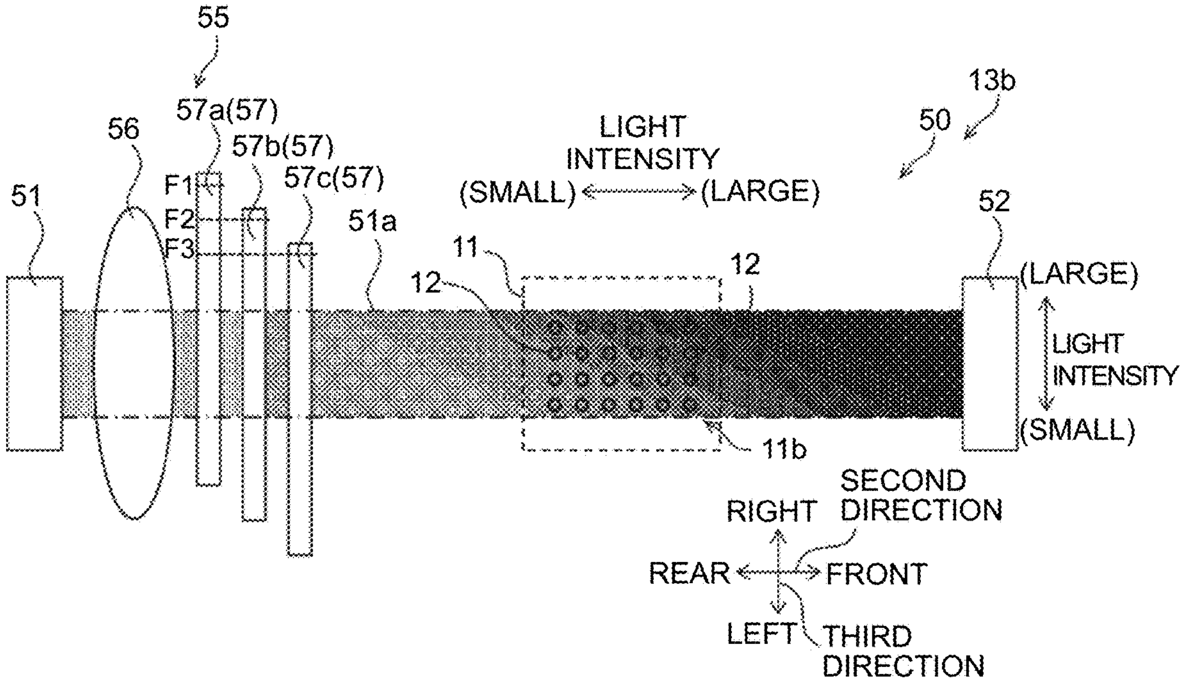
FIG. 12A is a schematic view of a detecting unit, in a printing apparatus, viewed from above.

A printing apparatus 10 according to a sixth modified embodiment is configured as follows. That is, in the embodiment described above, as depicted in FIG. 12A, a plurality of optical filters 57 (for example, a first optical filter 57*a*, a second optical filter 57*b*, and a third optical filter 57*c*) are arranged in the front-rear direction. The first optical filter 57*a*, the second optical filter 57*b*, and the third optical filter 57*c* are arranged in this order from the rear. The optical filters 57*a* to 57*c* are in such attitudes that the optical filters 57*a* to 57*c* intersect (for example, orthogonally cross) the front-rear direction, and the optical filters 57*a* to 57*c* intersect the optical path 51*a* so that the light emitted frontwardly from the light-emitting element 51 passes therethrough at a position between the light-emitting element 51 and the flying area 11*b*. In the exemplary case depicted in FIG. 12A, the plurality of optical filters 57*a* to 57*c* are arranged at a position between the lens 56 and the flying area 11*b*. However, at least a part of the optical filters 57*a* to 57*c* may be arranged between the light-emitting element 51 and the lens 56. Further, the optical filters 57*a* to 57*c* may be either of the absorption type or the reflection type.

Figure 12B:
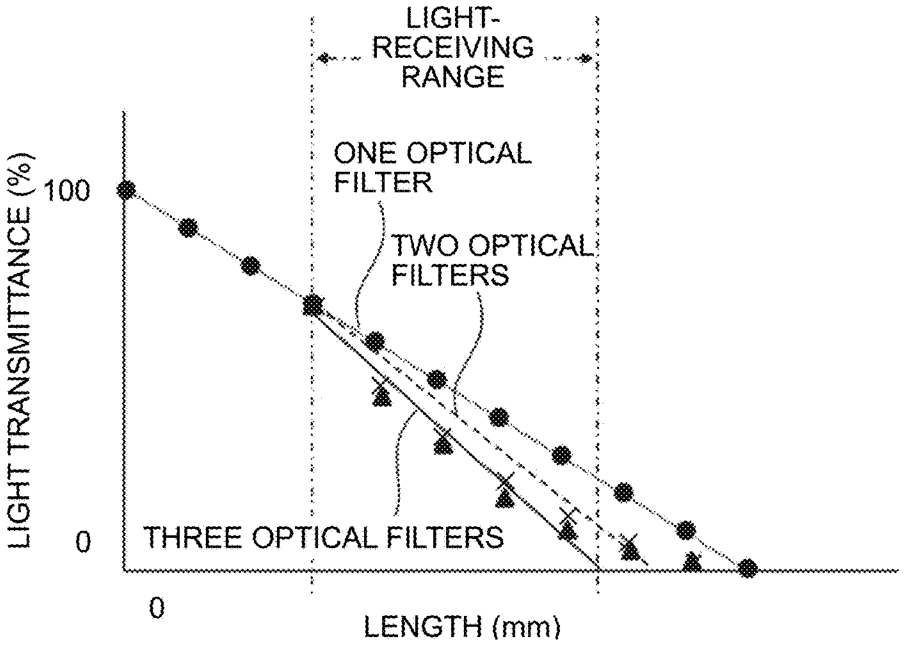
FIG. 12B is a graph depicting a relationship of the transmittance of light with respect to the length of an optical filter.

The graph in FIG. 12B depicts the relationship between the length in the left-right direction from the position F1 and the light transmittances of the optical filters 57*a* to 57*c*. In this case, the plurality of optical filters 57*a* to 57*c* have the gradients in which the light transmittances are increased at more rightward positions in the left-right direction, and the plurality of optical filters 57*a* to 57*c* have the gradients of the light transmittances identical with each other. A dotted line depicted in FIG. 12B represents a graph of the light transmittance of the first optical filter 57*a*. The first optical filter 57*a* is arranged so that the position, at which the light transmittance thereof is 100%, is coincident with the position F1.

A broken line depicted in FIG. 12B represents a graph of the light transmittance of the light which passes through the first optical filter 57*a* and the second optical filter 57*b* when the first optical filter 57*a* and the second optical filter 57*b* are arranged while being overlapped with each other in the front-rear direction. In this case, the second optical filter 57*b* is arranged or aligned while being deviated leftwardly from the first optical filter 57*a* so that the position at which the light transmittance of the first optical filter 57*a* is 80% and the position at which the light transmittance of the second optical filter 57*b* is 100% are arranged at the position F2 which is disposed leftwardly from the position F1 in the left-right direction.

A solid line depicted in FIG. 12B is a graph of the light transmittance of the light which passes through the optical filters 57*a* to 57*c* when the first optical filter 57*a*, the second optical filter 57*b*, and the third optical filter 57*c* are arranged while being overlapped with each other in the front-rear direction. In this case, the third optical filter 57*c* is arranged while being deviated leftwardly from the second optical filter 57*b* so that the position at which the light transmittance of the first optical filter 57*a* is 60%, the position at which the light transmittance of the second optical filter 57*b* is 80%, and the position at which the light transmittance of the third optical filter 57*c* is 100% are arranged at the position F3 which is disposed leftwardly from the position F2 in the left-right direction.

In this manner, the larger the number of the optical filters 57*a* to 57*c* through which the light coming from the light-emitting element 51 passes is, the larger the gradient of the light transmittance with respect to the length in the left-right direction is. On this account, the gradient of the light intensity is increased in the left-right direction in relation to the optical path 51*a* of the light allowed to pass through the plurality of optical filters 57*a* to 57*c*. Accordingly, the height of the light-receiving signal greatly changes with respect to the deviation of the flying direction of the ink droplet I in the left-right direction. Therefore, it is possible to accurately detect the deviation of the flying direction of the ink droplet I in the left-right direction. Note that the plurality of optical filters 57*a* to 57*c* may be arranged in the front-rear direction without being deviated in the left-right direction.

Seventh Modified Embodiment

Figure 13:
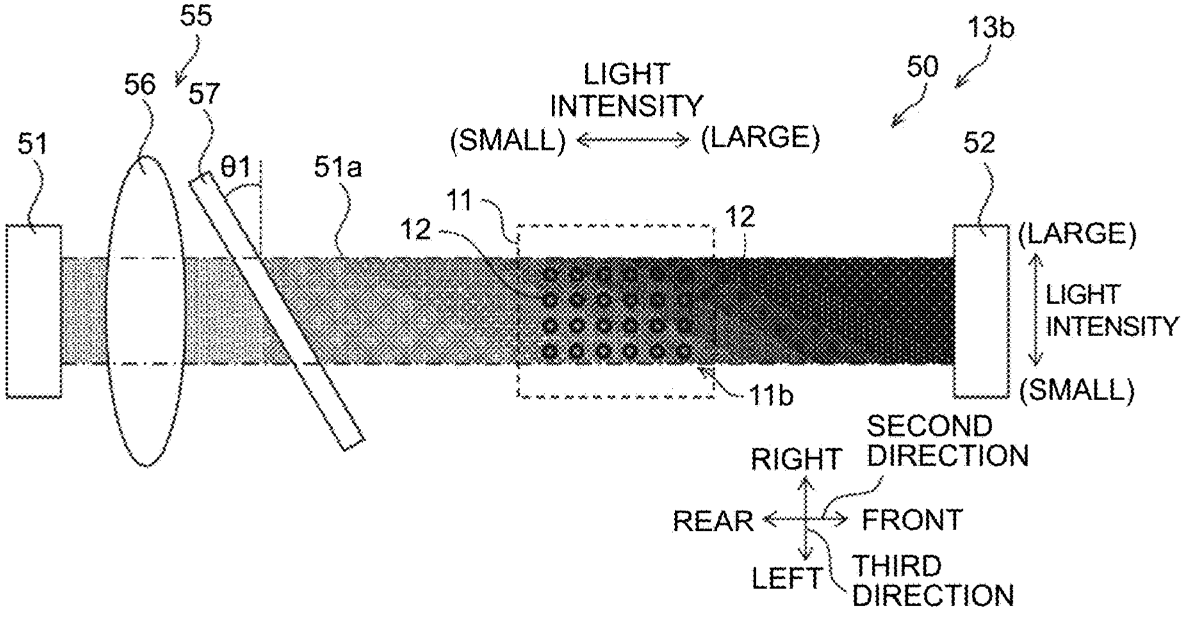
FIG. 13 is a schematic view of a detecting unit, in a printing apparatus, viewed from above.

A printing apparatus 10 according to a seventh modified embodiment is configured as follows. That is, in the embodiment described above, as depicted in FIG. 13, the optical filter 57 is arranged so that the optical filter 57 is inclined with respect to the front-rear direction and the left-right direction. The optical filter 57 has, for example, a rectangular flat plate-shaped form, and the optical filter 57 intersects the optical path 51*a* so that the light emitted frontwardly from the light-emitting element 51 passes therethrough at a position between the light-emitting element 51 and the flying area 11*b*. The optical filter 57 is parallel to the up-down direction, and the optical filter 57 is inclined with respect to the both directions of the front-rear direction and the left-right direction.

If the optical filter 57 is inclined by an inclination angle θ1 with respect to the left-right direction, and the light transmittance with respect to the length in the left-right direction of the optical filter 57 is linear, then the gradient of the light intensity of the optical path 51*a* allowed to pass through the optical filter 57 is increased (1/cos θ1) times. In this manner, the larger the inclination angle θ1 of the optical filter 57 with respect to the left-right direction is, the larger the gradient of the light intensity of the optical path 51*a* in the left-right direction is. Accordingly, the change of the height of the light-receiving signal with respect to the deviation of the flying direction of the ink droplet I in the left-right direction is increased. Therefore, it is possible to accurately detect the deviation of the flying direction of the ink droplet I in the left-right direction.

Eighth Modified Embodiment

Figure 14:
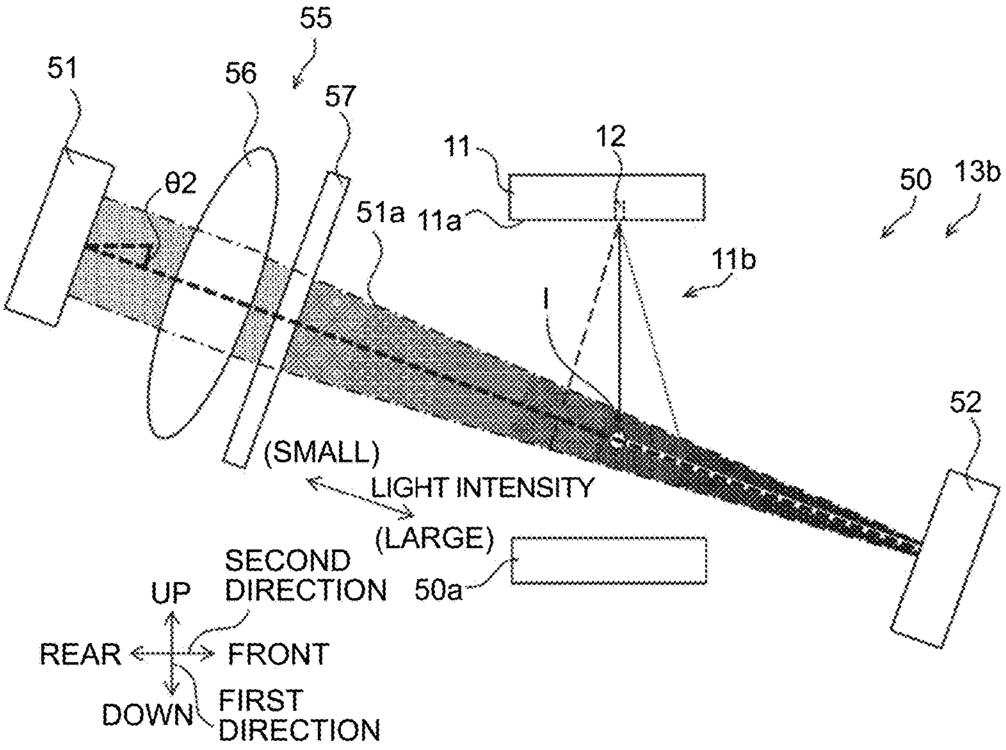
FIG. 14 is a schematic view of a detecting unit, in a printing apparatus, viewed from left.

A printing apparatus 10 according to an eighth modified embodiment is configured as follows. That is, in the embodiment and the first to seventh modified embodiments described above, as depicted in FIG. 14, the light-emitting element 51 and the light-receiving element 52 are arranged so that the optical path 51*a* is inclined with respect to the up-down direction and the front-rear direction. The light-emitting element 51 is arranged so that the optical path 51*a*, which is the route of the light emitted from the light-emitting element 51, is parallel to the left-right direction, and the optical path 51*a* is inclined with respect to the both directions of the up-down direction and the front-rear direction. Further, the light-receiving element 52 is arranged opposingly to the light-emitting element 51 so that the-light receiving element 52 receives the light emitted from the light-emitting element 51.

The optical path 51*a* is inclined with respect to the discharge surface 11*a* of the head 11, and the optical path 51*a* is orthogonal to the optical filter 57. Further, if the optical path 51*a* is inclined by an inclination angle θ2 with respect to the front-rear direction, and the light transmittance with respect to the length in the left-right direction of the optical filter 57 is linear, then the gradient of the light intensity of the optical path 51*a* allowed to pass through the optical filter 57 is increased (1/cos θ2) times. In this manner, the larger the inclination angle θ2 of the optical path 51*a* with respect to the front-rear direction is, the larger the gradient of the light intensity of the optical path 51*a* in the front-rear direction is. Accordingly, the change of the height of the light-receiving signal with respect to the deviation of the flying direction of the ink droplet I in the front-rear direction is increased. Therefore, it is possible to accurately detect the deviation of the flying direction of the ink droplet I in the front-rear direction.

Ninth Modified Embodiment

A printing apparatus 10 according to a ninth modified embodiment is configured as follows. That is, in the embodiment and the first to eighth modified embodiments described above, the light-emitting element 51 and the light-receiving element 52 are arranged so that the value, which is a predetermined number times the standard deviation of the normal distribution indicating the probability distribution of the landing position of the ink droplet I on the printing medium A, is present within a threshold value of the positional deviation of the ink droplet I landed on the printing medium A, and the distance, which ranges from the discharge surface 11*a* to the optical path 51*a*, is longest in the up-down direction.

Figure 15A:
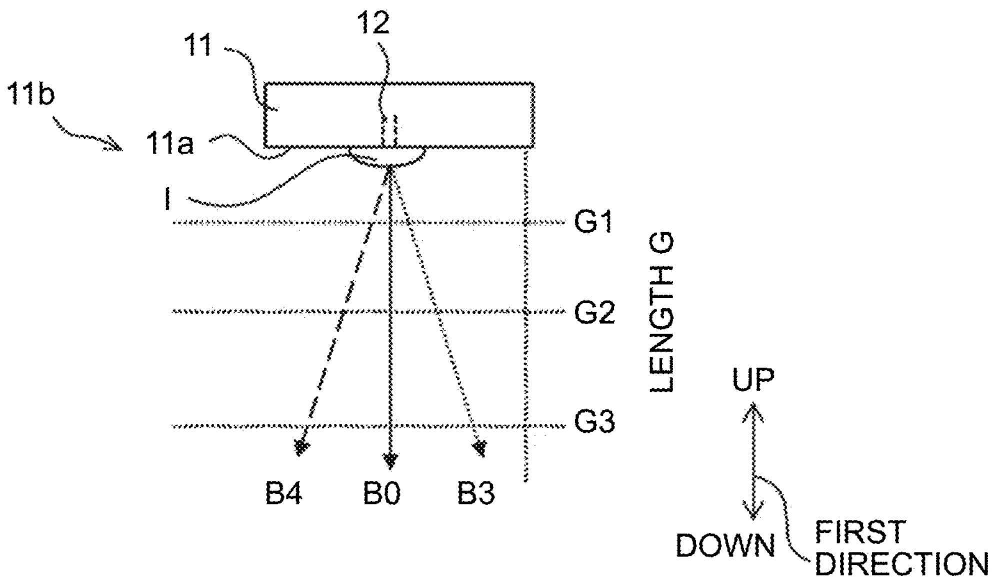
FIG. 15A depicts a relationship between the flying direction of the ink droplet and the distance from the discharge surface in the up-down direction in relation to a printing apparatus.

Specifically, as depicted by a solid line in FIG. 15A, the ink droplet I, which is discharged downwardly from the nozzle 12, flies in the downward direction which is the predetermined flying direction B0. On the other hand, as depicted by a dotted line and a broken line in FIG. 15A, the flying directions B3, B4 of the ink droplet I are deviated from the predetermined flying direction B0 in some cases. In such situations, the larger the length G from the nozzle 12 in the up-down direction is, the larger the deviation amount of the flying position of the ink droplet I from the predetermined flying direction B0 in the direction orthogonal to the up-down direction is. Therefore, it is easy to detect the deviation of the flying direction of the ink droplet I. However, when the length G is excessively large, even if the deviation of the flying direction is small and acceptable, then the deviation is detected as the deviation of the flying direction.

Figure 15B:
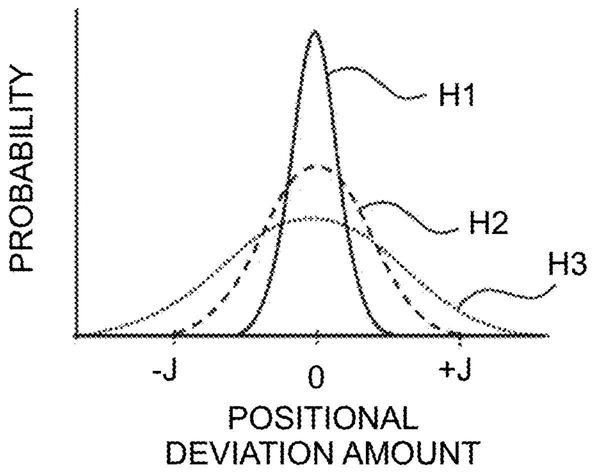
FIG. 15B is a graph depicting normal distributions indicating probability distributions of the landing position of the ink droplet.

In view of the above circumstances, as depicted in FIG. 15B, the light-emitting element 51 and the light-receiving element 52 are arranged on the basis of the normal distribution which indicates the probability distribution of the landing position of the ink droplet I on the printing medium A. The vertical axis of the graph depicted in FIG. 15B indicates the probability of the landing position of the ink droplet I on the printing medium A, and the horizontal axis indicates the deviation amount of the landing position of the ink droplet I from the landing position of the ink droplet I allowed to fly in the predetermined flying direction B0.

That is, when the printing medium A is positioned at the position of the length G1 as depicted in FIG. 15A, the probability distribution of the landing position of the ink droplet I is represented by a normal distribution H1 as depicted in FIG. 15B. When the printing medium A is positioned at the position of the length G2 which is longer than the length G1 as depicted in FIG. 15A, the positional deviation amount is increased in a normal distribution H2 of the landing position of the ink droplet I as compared with the normal distribution H1 as depicted in FIG. 15B. When the printing medium A is positioned at the position of the length G3 which is longer than the length G2 as depicted in FIG. 15A, the positional deviation amount is increased in a normal distribution H3 of the landing position of the ink droplet I as compared with the normal distribution H2 as depicted in FIG. 15B.

The lengths G corresponding to the normal distributions such as described below are selected. That is, the normal distributions in each of which the value (for example, $3\sigma$) that is a predetermined number times the standard deviation $\theta$ in the normal distribution as described above is within the threshold value J (for example, 20 μm) of the positional deviation of the ink droplet I landed on the printing medium A. Further, the maximum length G of the lengths G selected as described above is selected. The light-emitting element 51 and the light-receiving element 52 are arranged so that the central axis of the optical path 51*a* is positioned at the position of the maximum length G selected as described above. Accordingly, erroneous detection, which results from the optical noise and the electric noise, can be suppressed, and it is possible to accurately detect the deviation of the flying direction of the ink droplet I.

Tenth Modified Embodiment

As depicted in FIG. 2, a printing apparatus 10 according to a tenth modified embodiment is configured as follows. That is, in the embodiment and the first to ninth modified embodiments described above, it is provided with a plurality of amplifiers 54 which amplify the signal corresponding to the light-receiving amount of the light-receiving element 52 by mutually different amplification factors. The nozzle 12 includes a first nozzle 12, and a second nozzle 12 which is positioned in one direction of the left-right direction as compared with the first nozzle 12. If the light intensity of the light passing through the flying position of the ink droplet I discharged from the second nozzle 12 is smaller than the light intensity of the light passing through the flying position of the ink droplet I discharged from the first nozzle 12, the controller 20 allows the amplifier 54 having the large amplification factor to amplify the signal of the light-receiving amount of the light-receiving element 52 when the ink droplet I is discharged from the second nozzle 12 rather than when the ink droplet I is discharged from the first nozzle 12.

Specifically, the amplifier 54 has, for example, a circuit which amplifies the light-receiving signal by amplification factors of not less than 1. The amplifier 54 includes a plurality of amplifies 54 (for example, a first amplifier 54*a*, a second amplifier 54*b*, and a third amplifier 54*c*) which have mutually different amplification factors. The second amplification factor of the second amplifier 54*b* is larger than the first amplification factor of the first amplifier 54*a*. The third amplification factor of the third amplifier 54*c* is larger than the second amplification factor of the second amplifier 54*b*. The amplifier 54 is connected to a switching unit 61, and the switching unit 61 is connected to the controller 20. The switching unit 61 is controlled by the controller 20 so that the amplifier 54, to which the light-receiving element 52 is connected, is switched depending on the nozzle 12 for discharging the ink droplet I.

Figure 16A:
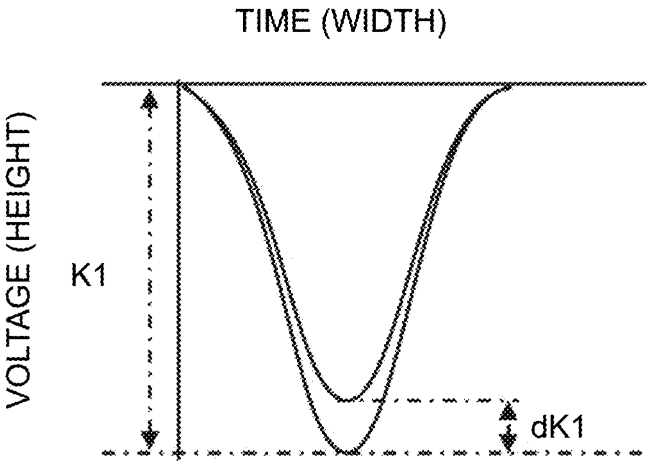
FIG. 16A is a graph depicting first light-receiving signals when the ink droplet is discharged from a first nozzle.
Figure 16B:
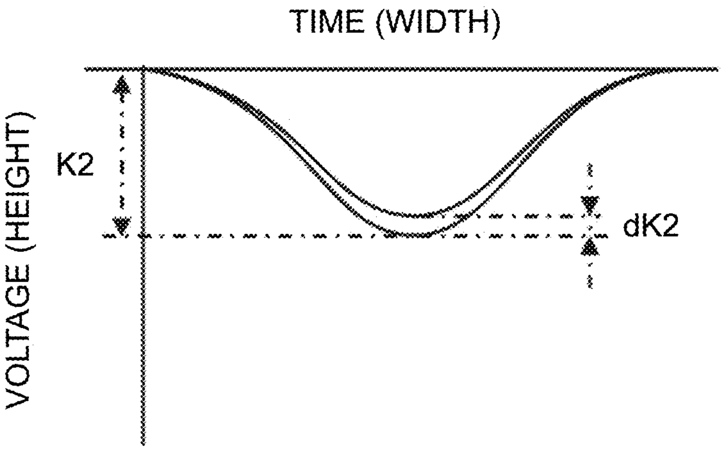
FIG. 16B is a graph depicting second light-receiving signals when the ink droplet is discharged from a second nozzle.

In the exemplary case depicted in FIG. 3A, the light intensity of the optical path 51*a* is decreased at more leftward positions in the left-right direction. The controller 20 allows the nozzle 12 to discharge the ink droplet I therefrom, the nozzle 12 of the head 11 being arranged over or above the optical path 51*a*. When the ink droplet I flies through the optical path 51*a*, the light intensity of the light passing through the flying position of the ink droplet I discharged from the second nozzle 12 disposed leftwardly from the first nozzle 12 is smaller than the light intensity of the light passing through the flying position of the ink droplet I discharged from the first nozzle 12. The height K2 of the peak of the second light-receiving signal corresponding to the light intensity of the light interrupted by the ink droplet I discharged from the second nozzle 12 as depicted in FIG. 16B is smaller than the height K1 of the peak of the first light-receiving signal corresponding to the light intensity of the light interrupted by the ink droplet I discharged from the first nozzle 12 as depicted in FIG. 16A.

Further, when the flying direction of the ink droplet I is deviated with respect to the predetermined flying direction B0, the change amount of the height of the light-receiving signal caused by the deviation corresponds to the height of the peak of the light-receiving signal. On this account, when the height K2 of the second light-receiving signal is smaller than the height K1 of the first light-receiving signal, the change amount dK2 of the height of the second light-receiving signal is smaller than the change amount dK1 of the height of the first light-receiving signal. In relation thereto, if the amplification factor of the light-receiving signal obtained by the amplifier 54 is evenly increased, it is feared that the light-receiving signal having the large height may be excessively increased to exceed the limit of the data processing. In view of the above circumstances, the controller 20 controls the amplification factor of the light-receiving signal depending on the position of the nozzle 12 for discharging the ink droplet I corresponding to the light intensity of the light passing through the flying position of the ink droplet I discharged from the nozzle 12 in the optical path 51*a*.

For example, as depicted in FIG. 3, when the ink droplet I is discharged from the nozzle 12 of the first nozzle array 12*a* or the second nozzle array 12*b*, the controller 20 controls the switching unit 61 so that the light-receiving element 52 is connected to the first amplifier 54*a*. In this case, the light intensity of the light passing through the flying position of the ink droplet I in the optical path 51*a* is large, and hence the light-receiving signal of the light-receiving amount corresponding to the light intensity of the optical path 51*a* interrupted by the ink droplet I is large. Accordingly, the light-receiving signal is amplified by the first amplifier 54*a* by the small first amplification factor. Therefore, the amplified light-receiving signal is not excessively increased. The controller 20 can detect the deviation of the flying direction of the ink droplet I on the basis of the amplified light-receiving signal.

Further, when the ink droplet I is discharged from the nozzle 12 of the third nozzle array 12*c* disposed leftwardly from the second nozzle array 12*b*, the controller 20 controls the switching unit 61 so that the light-receiving element 52 is connected to the second amplifier 54*b*. In this case, the light intensity of the light passing through the flying position of the ink droplet I in the optical path 51*a* is smaller than the light intensity of the light passing through the flying position of the ink droplet I discharged from the nozzle 12 of the second nozzle array 12*b*. On this account, the light-receiving signal of the light-receiving amount corresponding to the light intensity is small when the ink droplet I is discharged from the nozzle 12 of the third nozzle array 12*c* as compared with when the ink droplet I is discharged from the nozzle 12 of the second nozzle array 12*b*. Accordingly, the light-receiving signal is amplified by the second amplifier 54*b* by the second amplification factor which is larger than the first amplification factor. Therefore, the controller 20 can detect the deviation of the flying direction of the ink droplet I on the basis of the amplified light-receiving signal.

Further, when the ink droplet I is discharged from the nozzle 12 of the fourth nozzle array 12*d* disposed leftwardly from the third nozzle array 12*c*, the controller 20 controls the switching unit 61 so that the light-receiving element 52 is connected to the third amplifier 54*c*. In this case, the light intensity of the light passing through the flying position of the ink droplet I in the optical path 51*a* is smaller than the light intensity of the light passing through the flying position of the ink droplet I discharged from the nozzle 12 of the third nozzle array 12*c*. On this account, the light-receiving signal of the light-receiving amount corresponding to the light intensity is small when the ink droplet I is discharged from the nozzle 12 of the fourth nozzle array 12*d* as compared with when the ink droplet I is discharged from the nozzle 12 of the third nozzle array 12*c*. Accordingly, the light-receiving signal is amplified by the third amplifier 54*c* by the third amplification factor which is larger than the second amplification factor. Therefore, the controller 20 can detect the deviation of the flying direction of the ink droplet I on the basis of the amplified light-receiving signal.

In this manner, when the light intensity of the optical path 51*a* interrupted by the ink droplet I discharged from the nozzle 12 differs in the left-right direction, the controller 20 changes the amplification factor of the light-receiving signal depending on the position of the nozzle 12 for discharging the ink droplet I so that the smaller the light intensity is, the larger the amplification factor of the light-receiving signal having the height corresponding to the light intensity is. Accordingly, the light-receiving signal can be appropriately amplified to reduce the difference in the height of the light-receiving signal corresponding to the position of the nozzle 12. Thus, it is possible to accurately detect the deviation of the flying direction of the ink droplet I corresponding to the change of the height of the light-receiving signal. Note that in the same manner as described above, when the light intensity of the optical path 51*a* interrupted by the ink droplet I discharged from the nozzle 12 differs in the front-rear direction, the controller 20 may change the amplification factor of the light-receiving signal depending on the position of the nozzle 12 for discharging the ink droplet I so that the smaller the light intensity is, the larger the amplification factor of the light-receiving signal having the height corresponding to the light intensity is.

Eleventh Modified Embodiment

A printing apparatus 10 according to an eleventh modified embodiment is configured as follows. That is, in the embodiment as well as the fourth modified embodiment and the eighth to tenth modified embodiments described above, as depicted in FIG. 9A and FIG. 9B, the gradient adding member 55 includes a lens 56 which adds the gradient to the light intensity of the optical path 51*a* in the front-rear direction. The nozzle 12 has a first nozzle 12, and a second nozzle 12 which is positioned in one direction of the left-right direction as compared with the first nozzle 12. The controller 20 switches the driving of the light-emitting element 51*c* between a first light emission mode in which the light-emitting element 51*c* is driven to provide such a first pattern that the light intensity of the light passing through the flying position of the ink droplet I discharged from the second nozzle 12 is smaller than the light intensity of the light passing through the flying position of the ink droplet I discharged from the first nozzle 12 and a second light emission mode in which the light-emitting element 51*c* is driven to provide such a second pattern that the light intensity of the light passing through the flying position of the ink droplet I discharged from the second nozzle 12 is larger than that of the first pattern.

Specifically, the lens 56 is the same as or equivalent to, for example, the lens 56 depicted in FIG. 3B. The light is not converged in the left-right direction, and the light is converged so that the dimension in the up-down direction is decreased at more frontward positions. Accordingly, the lens 56 adds the gradient to the light intensity of the optical path 51*a* in the front-rear direction so that the light intensity is increased at more frontward positions. Further, as depicted in FIG. 9B, the light-emitting element 51*c* has a plurality of areas (for example, a fifth area 59*e* to an eighth area 59*h*). A plurality of (for example, three) light sources 53 are provided in each of the areas of the fifth area 59*e* to the eighth area 59*h*. The light intensity of the light emitted by each of the light sources 53 is variable, and the light intensity is controlled by the controller 20.

For example, when the controller 20 controls the light-emitting element 51*c* so that the light intensity of the light emitted by the light source 53 is decreased in an order of the light sources 53 in the fifth area 59*e*, the light sources 53 in the sixth area 59*f*, the light sources 53 in the seventh area 59*g*, and the light sources 53 in the eighth area 59*h*, the light intensity of the optical path 51*a* is in the first pattern to provide the gradient in which the light intensity is decreased at more leftward positions. The controller 20 allows the nozzle 12 of the head 11 arranged over or above the optical path 51*a* to discharge the ink droplet I therefrom. In this case, as for the optical path 51*a*, the light intensity of the light passing through the flying position of the ink droplet I discharged from the second nozzle 12 disposed leftwardly from the first nozzle 12 is smaller than the light intensity of the light passing through the flying position of the ink droplet I discharged from the first nozzle 12. The smaller the optical intensity is, the smaller the height of the peak of the light-receiving signal is. The smaller the optical intensity is, the change of the height of the light-receiving signal corresponding to the deviation of the flying direction of the ink droplet I is as well. In view of the above circumstances, the controller 20 controls the light intensity of the light-emitting element 51*c* in accordance with the position of the nozzle 12 for discharging the ink droplet I corresponding to the light intensity of the light passing through the flying position of the ink droplet I discharged from the nozzle 12.

Figure 9A:
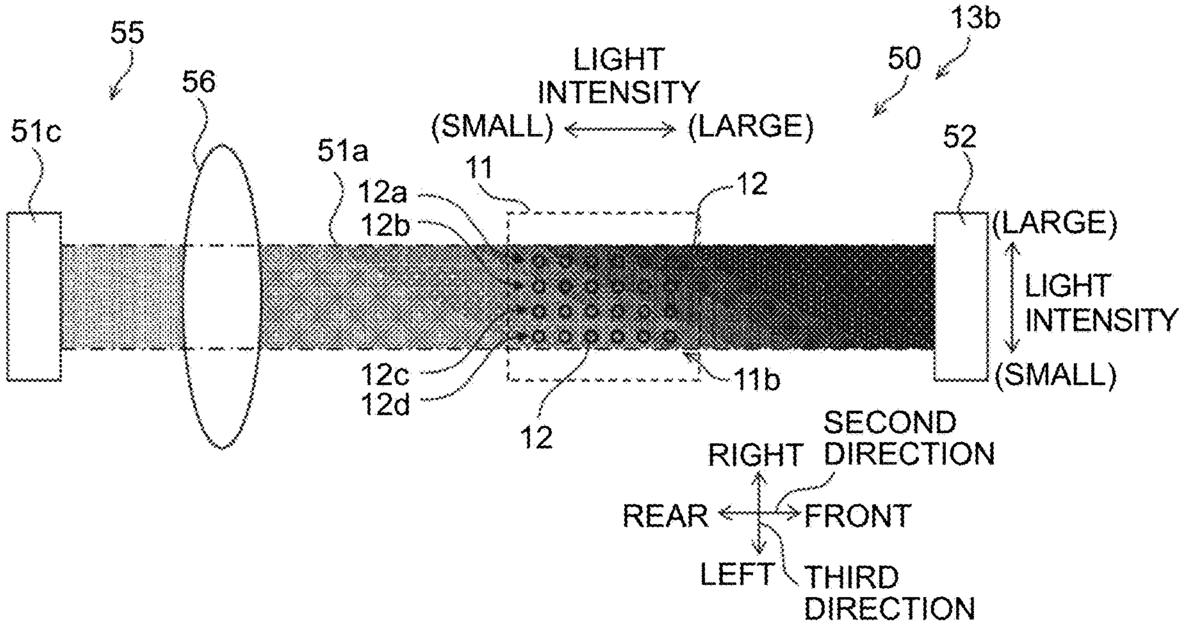
FIG. 9A is a schematic view of a detecting unit, in a printing apparatus, viewed from above.
Figure 9B:
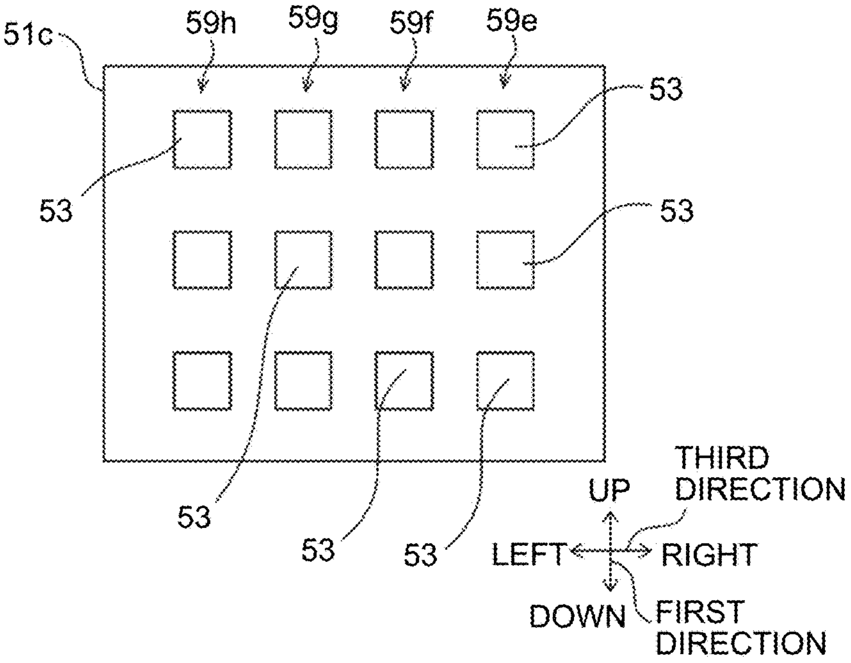
FIG. 9B is a schematic view of a light-emitting element of the detecting unit depicted in FIG. 9A viewed from front.

For example, as depicted in FIG. 9A, when the ink droplet I is discharged from the nozzle 12 of the first nozzle array 12*a*, the controller 20 drives the light-emitting element 51*c* in the first light emission mode. In the first light emission mode, for example, the controller 20 controls the light-emitting element 51*c* so that the light sources 53 in the fifth area 59*e* have a light intensity of 100%, wherein the light intensity of the light emitted by the light sources 53 is decreased by a predetermined light intensity, for example, by 20% in an order of the light sources 53 in the fifth area 59*e*, the light sources 53 in the sixth area 59*f*, the light sources 53 in the seventh area 59*g*, and the light sources 53 in the eighth area 59*h*. Accordingly, the light intensity of the optical path 51*a* has the first pattern in which the light intensity has such a gradient that the light intensity is decreased at more leftward positions.

However, in the case of the light intensity of the optical path 51*a* of the first pattern, the light intensity of the light passing through the flying position of the ink droplet I discharged from the nozzle 12 of the fourth nozzle array 12*d* is rather decreased. In view of the above circumstances, when the ink droplet I is discharged from the nozzle 12 of the fourth nozzle array 12*d*, the controller 20 drives the light-emitting element 51*c* in the second light emission mode. In the second light emission mode, the controller 20 does not turn ON the light sources 53 in the fifth area 59*e*, and the controller 20 allows the light sources 53 in the sixth area 59*f* to have a light intensity of 100%. The controller 20 controls the light-emitting element 51*c* so that the light intensity of the light emitted by the light sources 53 is decreased by a predetermined light intensity, for example, by 20% in an order of the light sources 53 in the seventh area 59*g* and the light sources 53 in the eighth area 59*h*. Accordingly, the second pattern is provided in relation to the optical path 51*a*, in which the light intensity of the light passing through the flying position of the ink droplet I discharged from the nozzle 12 of the fourth nozzle array 12*d* is larger than that in the first pattern. Accordingly, the height of the light-receiving signal corresponding to the light intensity is increased, and the change of the height of the light-receiving signal corresponding to the deviation of the flying direction of the ink droplet I is increased as well. Thus, the controller 20 can accurately detect the deviation of the flying direction of the ink droplet I depending on the change of the height of the light-receiving signal.

Twelfth Modified Embodiment

A printing apparatus 10 according to a twelfth modified embodiment is configured as follows. That is, in the embodiment and the first to eleventh modified embodiments described above, the controller 20 deals with a waveform indicating the temporal variation (the time-dependent change) of the light-receiving amount of the light-receiving element 52, the waveform indicating the light-receiving amount by the height of the signal and indicating the elapsed time by the width of the signal. It is assumed a case that the waveform, which is obtained when the ink droplet I flies in a first manner, has a symmetrical shape in the widthwise direction. In such a case, when the ink droplet I flies in a second manner, if the width of the signal is the same as the width of the signal obtained in the first manner, and the height of the signal has a difference of not less than a predetermined value as compared with the height of the signal obtained in the first manner, then the controller 20 determines that the size of the ink droplet I discharged in the second manner is different from the size of the ink droplet I discharged in the first manner.

Specifically, as depicted in FIG. 5A, for example, if the flying direction of the ink droplet I is deviated from the predetermined flying direction B0, as depicted in FIG. 5B and FIG. 5C, each of the heights E1, E2 of the light-receiving signals F1, F2 is different from the height E0 of the light-receiving signal F0 obtained when the flying direction of the ink droplet I is the predetermined flying direction B0. Further, as depicted in FIG. 5A, for example, if the flying direction of the ink droplet I is deviated from the predetermined flying direction B0, the light intensity of the optical path 51*a* interrupted by the ink droplet I changes depending on the time. On this account, as depicted in FIG. 5B and FIG. 5C, the waveform of the light-receiving signal has the asymmetrical shape in the widthwise direction. Further, as depicted in FIG. 5A, if the flying direction of the ink droplet I is deviated from the predetermined flying direction B0, the time, for which the ink droplet I interrupts the optical path 51*a*, is shorter than the time which is provided if the flying direction of the ink droplet I is the predetermined flying direction B0. On this account, as depicted in FIG. 5B and FIG. 5C, each of the widths of the light-receiving signals F1, F2 is smaller than the width of the light-receiving signal F0.

Figure 17A:
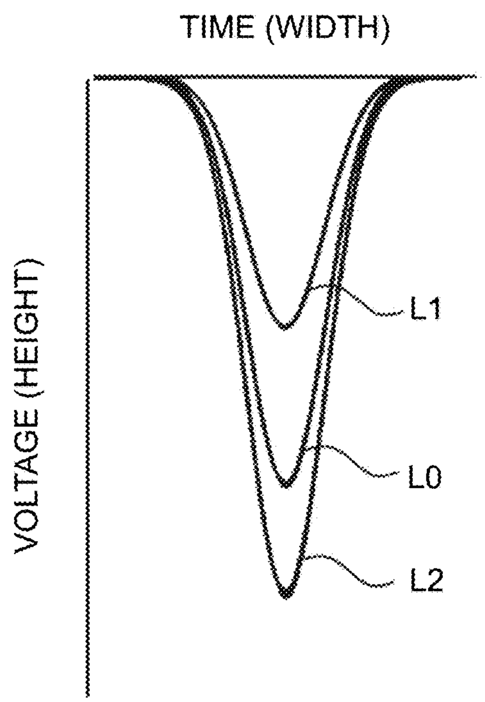
FIG. 17A is a graph depicting the light-receiving signals depending on the size of the ink droplet brought about by a detecting unit of a printing apparatus.

In relation thereto, the height of the light-receiving signal also changes when the size of the ink droplet I is different from a predetermined size, because the area of the light interrupted by the ink droplet I differs. For example, as depicted in FIG. 17A, the height of the peak of the light-receiving signal L1, which is obtained when the ink droplet I smaller than the predetermined size flies through the optical path 51*a*, is smaller than the height of the peak of the light-receiving signal L0 which is obtained when the ink droplet I having the predetermined size flies through the optical path 51*a*. Further, the height of the peak of the light-receiving signal L2, which is obtained when the ink droplet I larger than the predetermined size flies through the optical path 51*a*, is larger than the height of the peak of the light-receiving signal L0 which is obtained when the ink droplet I having the predetermined size flies through the optical path 51*a*.

However, when the size of the ink droplet I is different from the predetermined size, the light intensity of the optical path 51*a* interrupted by the ink droplet I allowed to fly downwardly from the nozzle 12 does not change with respect to the time. Therefore, the waveforms of the light-receiving signals L1, L2 have symmetrical shapes in the widthwise direction in the same manner as the waveform of the light-receiving signal L0. Further, even when the size of the ink droplet I is different from the predetermined size, the time, for which the optical path 51*a* is interrupted by the ink droplet I allowed to fly downwardly from the nozzle 12, does not change. Therefore, the widths of the light-receiving signals L1, L2 are the same as the width of the light-receiving signal L0.

On this account, it is possible to detect the size change of the ink droplet I on the basis of the waveform (shape) and the width of the light-receiving signal. In this case, if the shape of the light-receiving signal is symmetrical, the width of the light-receiving signal is the same as the width of the light-receiving signal L0, and the height of the light-receiving signal has the difference of not less than a predetermined value as compared with the height of the light-receiving signal L0, then the controller 20 may determine that the size of the ink droplet I is different from the predetermined size. Thus, for example, if the size of the ink droplet I is different from the predetermined size, it is possible to detect, for example, the deterioration of the driving element 16. Further, for example, the discharge timing of the ink droplet I is corrected depending on the difference in size, and thus it is possible to reduce the deterioration of the image quality of the printed image resulting from the difference in size.

Thirteenth Modified Embodiment

A printing apparatus 10 according to a thirteenth modified embodiment is configured as follows. That is, in the embodiment and the first to twelfth modified embodiments described above, the controller 20 deals with a waveform indicating the temporal variation (the time-dependent change) of the light-receiving amount of the light-receiving element 52, the waveform indicating the light-receiving amount by the height of the signal and indicating the elapsed time by the width of the signal. It is assumed a case that the waveform, which is obtained when the ink droplet I flies in a third manner (an example of “first manner”), has a symmetrical shape in the widthwise direction. In such a case, when the ink droplet I flies in a fourth manner (an example of “second manner”), if the height of the signal is the same as the height of the signal obtained in the third manner, and the width of the signal has a difference of not less than a predetermined value as compared with the width of the signal obtained in the third manner, then the controller 20 determines that the velocity of the ink droplet I discharged in the fourth manner is different from the velocity of the ink droplet I discharged in the third manner.

Figure 17B:
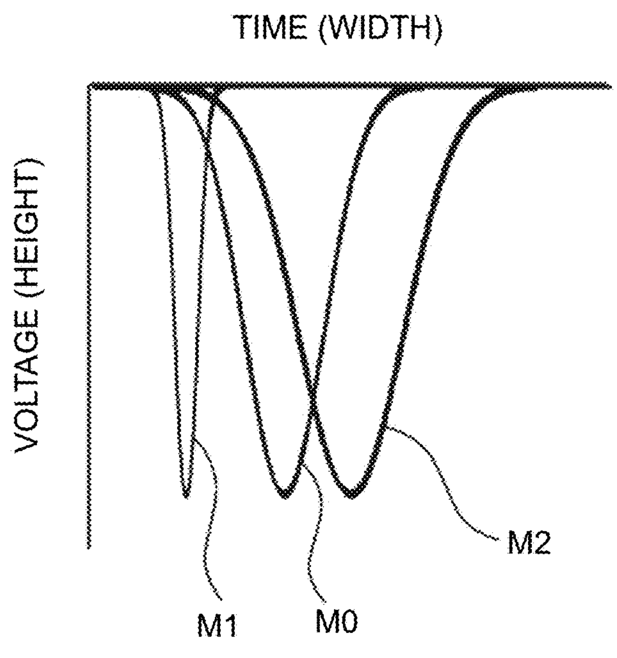
FIG. 17B is a graph depicting the light-receiving signals depending on the velocity of the ink droplet brought about by a detecting unit of a printing apparatus.

Specifically, when the velocity of the flying ink droplet I is different from a predetermined velocity, the area of the light interrupted by the ink droplet I allowed to fly downwardly from the nozzle 12 in the optical path 51*a* is unchanged from that to be obtained when the velocity of the ink droplet I is the predetermined velocity. On this account, as depicted in FIG. 17B, the height of the peak of the light-receiving signal M1 obtained when the ink droplet I flies through the optical path 51*a* at a velocity faster than the predetermined velocity and the height of the peak of the light-receiving signal M2 obtained when the ink droplet I flies through the optical path 51*a* at a velocity slower than the predetermined velocity are the same as the height of the peak of the light-receiving signal M0 obtained when the ink droplet I flies through the optical path 51*a* at the predetermined velocity.

Further, when the velocity of the ink droplet I is different from the predetermined velocity, the light intensity of the optical path 51*a* interrupted by the ink droplet I allowed to fly downwardly from the nozzle 12 is unchanged with respect to the time. Therefore, the waveforms of the light-receiving signals M1, M2 have symmetrical shapes in the widthwise direction in the same manner as the waveform of the light-receiving signal M0. Further, when the velocity of the ink droplet I is different from the predetermined velocity, then the faster the velocity is, the shorter the time of interruption of the optical path 51*a* by the ink droplet I allowed to fly downwardly from the nozzle 12 is. Therefore, the width of the light-receiving signal M1 is smaller than the width of the light-receiving signal M0. The slower the velocity is, the longer the time of interruption of the optical path 51*a* by the ink droplet I allowed to fly downwardly from the nozzle 12 is. Therefore, the width of the light-receiving signal M2 is larger than the width of the light-receiving signal M0.

On this account, it is possible to detect the velocity change of the ink droplet I on the basis of the waveform, the width, and the height of the light-receiving signal. In this case, if the shape of the light-receiving signal is symmetrical, the height of the light-receiving signal is the same as the height of the light-receiving signal M0, and the width of the light-receiving signal has the difference of not less than a predetermined value as compared with the width of the light-receiving signal M0, then the controller 20 may determine that the velocity of the flying ink droplet I is different from the predetermined velocity. Thus, for example, if the velocity of the flying ink droplet I is different from the predetermined velocity, it is possible to detect, for example, the deterioration of the driving element 16. Further, for example, the discharge timing of the ink droplet I is corrected depending on the difference in velocity, and thus it is possible to reduce the deterioration of the image quality of the printed image resulting from the difference in velocity.

Fourteenth Modified Embodiment

A printing apparatus 10 according to a fourteenth modified embodiment is configured as follows. That is, in the embodiment and the first to thirteenth modified embodiments described above, as depicted in FIG. 18A and FIG. 18B, apertures of the plurality of nozzles 12 are arranged or aligned to form arrays on the discharge surface 11*a*. The arrangement of the light-emitting element 51 includes a first arrangement in which the smaller angle of the angles between the optical path 51*a* (extending direction of the optical path 51*a*) and the arrangement direction in which the openings of the plurality of nozzles 12 are arranged or aligned is the first angle and a second arrangement in which the angle is the second angle different from the first angle. The controller 20 detects the deviation amount of the flying direction of the ink droplet I discharged from the nozzle 12 on the basis of the light-receiving amount of the light-receiving element 52 receiving the light coming from the light-emitting element 51 in each of the arrangements of the first arrangement and the second arrangement.

Figure 18A:
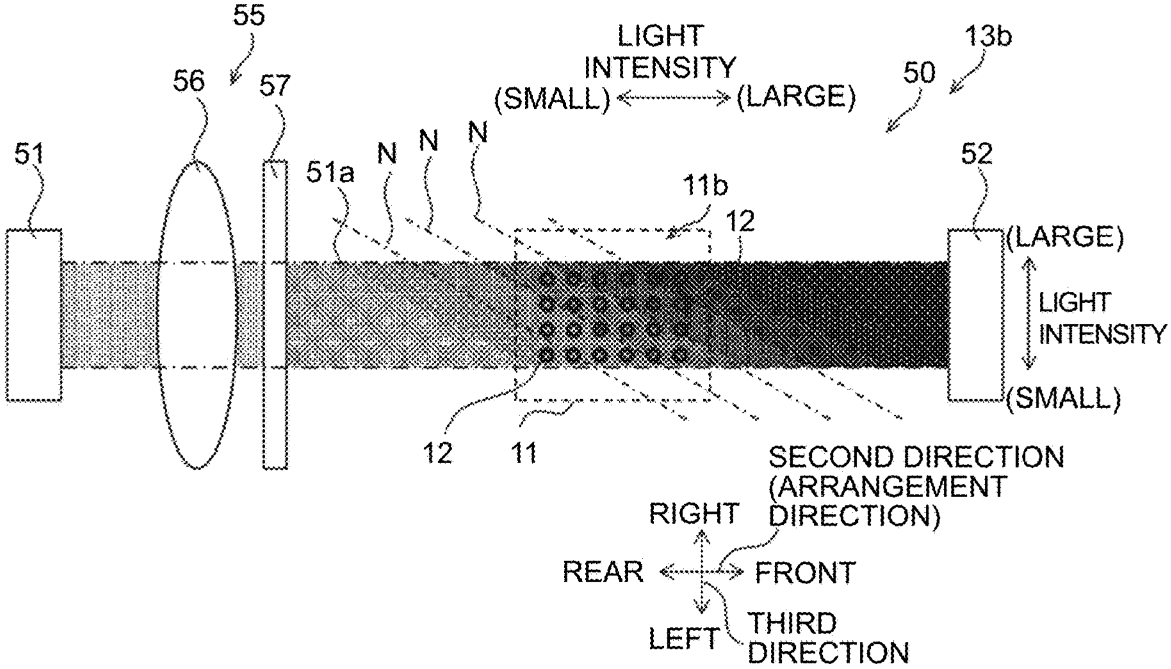
FIG. 18A is a schematic view of a detecting unit, in a printing apparatus, in a first arrangement viewed from above.

Specifically, as depicted in FIG. 18A, when the light is emitted frontwardly from the light-emitting element 51, the gradient of the light intensity is added to the optical path 51*a* by the gradient adding member 55 so that the light intensity is increased at more frontward positions and the light intensity is increased at more rightward positions. In this case, the contour lines N, on each of which an equal light intensity is provided in the optical path 51*a*, are inclined with respect to the front-rear direction and the left-right direction. On this account, it is possible to determine the presence or absence of the deviation of the flying direction of the ink droplet I on the basis of the height of the light-receiving signal, but it is impossible to detect the deviation amount. In view of the above circumstances, the ink droplet I is discharged from the mutually identical nozzle 12 by using the optical path 51*a* emitted from the light-emitting element 51 in the first arrangement and the second arrangement. Thus, it is possible to detect the deviation amount of the flying direction of the ink droplet I discharged from the nozzle 12. In this procedure, the discharge surface 11*a* of the head 11 intersects (for example, orthogonally crosses) the up-down direction, the plurality of nozzles 12 is open on the discharge surface 11*a*, and the openings are arranged or aligned in the front-rear direction to form arrays. The arrangement direction, in which the openings of the nozzles 12 are arranged or aligned, is the front-rear direction in the exemplary case depicted in FIG. 18A and FIG. 18B. The arrangement direction is not limited to the front-rear direction. The arrangement direction may be inclined with respect to the front-rear direction.

As depicted in FIG. 2, the detecting unit 50 of the printing apparatus 10 is provided with an arrangement changing device 62. The arrangement changing device 62 is configured such that the arrangement of the detecting unit 50 is changed between the first arrangement depicted in FIG. 18A and the second arrangement depicted in FIG. 18B by relatively moving the head 11 and the detecting unit 50. The arrangement changing device 62 is connected to the controller 20. The driving of the arrangement changing device 62 is controlled by the controller 20.

In the first arrangement depicted in FIG. 18A, the light-emitting element 51 emits the light frontwardly. The first angle, which is the smaller angle of the angles formed by the optical path 51*a* with respect to the front-rear direction, is, for example, 0 degree. The optical path 51*a* extends in the front-rear direction. The lens 56 is arranged while intersecting the optical path 51*a* so that the light intensity of the optical path 51*a* is increased at more frontward positions. The optical filter 57 is arranged while intersecting the optical path 51*a* so that the light intensity of the optical path 51 is increased at more rightward positions.

Figure 18B:
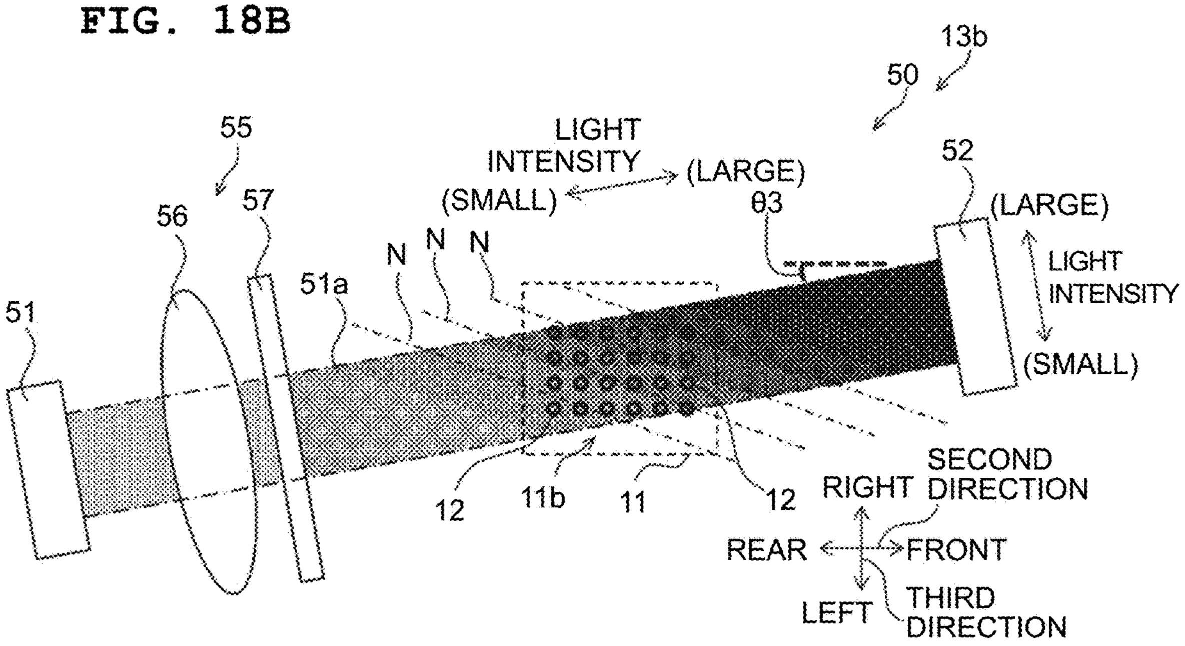
FIG. 18B is a schematic view of the detecting unit depicted in FIG. 18A in a second arrangement viewed from above.

In the second arrangement depicted in FIG. 18B, the second angle θ3, which is the smaller angle of the angles formed by the optical path 51*a* from the light-emitting element 51 with respect to the front-rear direction, is different from the first angle and is, for example, 10 degrees. The optical path 51*a* is inclined with respect to the front-rear direction and the left-right direction. The lens 56 is arranged while intersecting the optical path 51*a* so that the light intensity of the optical path 51*a* is increased at positions separated farther from the light-emitting element 51 in the extending direction of the optical path 51*a*. The optical filter 57 is arranged while intersecting the optical path 51*a* so that the light intensity of the optical path 51*a* is increased toward one side in the direction orthogonal to the extending direction of the optical path 51*a*. Accordingly, the contour lines N of the light intensity in the second arrangement depicted in FIG. 18B are inclined by a difference between the first angle and the second angle with respect to the contour lines N of the light intensity in the first arrangement depicted in FIG. 18A.

In the respective arrangements of the first arrangement and the second arrangement as described above, the controller 20 executes the detecting action by discharging the ink droplet I from the mutually identical nozzle 12. Accordingly, the controller 20 obtains the light-receiving signals of the heights each corresponding to the decrement of the light-receiving amount caused by the interruption of the optical path 51*a* by the ink droplet I in the respective arrangements of the first arrangement and the second arrangement. Then, the controller 20 obtains the contour line N of the light intensity of the optical path 51*a* corresponding to the height of the light-receiving signal in the first arrangement and the contour line N of the light intensity of the optical path 51*a* corresponding to the height of the light-receiving signal in the second arrangement, and the controller 20 obtains the point of intersection between these contour lines N. Then, the controller 20 obtains, as the deviation amount of the flying direction of the ink droplet I, the space between the point of intersection and the predetermined flying direction B0 from the nozzle 12 in the direction orthogonal to the up-down direction. In this manner, the controller 20 can detect the deviation amount of the flying direction of the ink droplet I discharged from the nozzle 12 on the basis of the light-receiving signals corresponding to the light-receiving amounts of the light-receiving element 52 receiving the light coming from the light-emitting element 51 in the respective arrangements of the first arrangement and the second arrangement. For example, the discharge timing of the ink droplet I is corrected depending on the deviation amount. Thus, it is possible to reduce the deterioration of the image quality of the printed image resulting from the deviation of the flying direction of the ink droplet I.

Fifteenth Modified Embodiment

A printing apparatus 10 according to a fifteenth modified embodiment is configured as follows. That is, in the embodiment and the sixth to thirteenth modified embodiments described above, as depicted in FIG. 19A and FIG. 19B, the arrangement of the optical filter 57 includes a third arrangement (an example of "first arrangement") in which the gradient is added to decrease the light intensity of the optical path 51*a* in one direction of the left-right direction and a fourth arrangement (an example of "second arrangement") in which the gradient is added to decrease the light intensity of the optical path 51*a* in the other direction of the left-right direction. The controller 20 detects the deviation amount of the flying direction of the ink droplet I discharged from the nozzle 12 on the basis of the light-receiving amounts of the light-receiving element 52 receiving the light allowed to pass through the optical filter 57 in the respective arrangements of the third arrangement and the fourth arrangement.

Figure 19A:
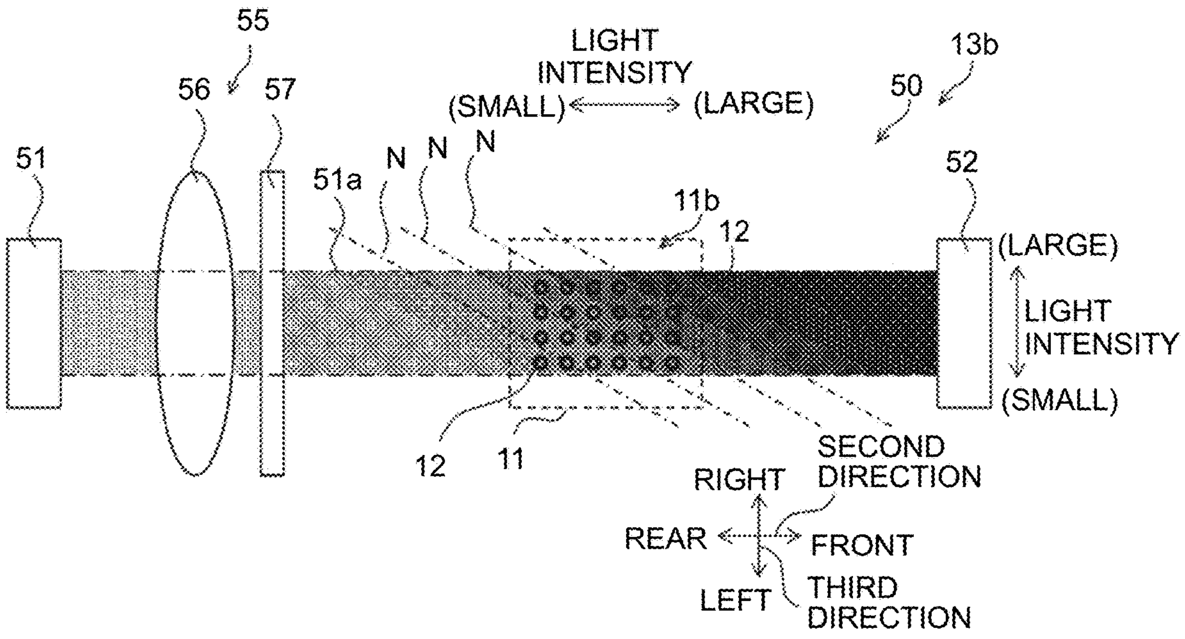
FIG. 19A is a schematic view of a detecting unit, in a printing apparatus, in a third arrangement viewed from above.
Figure 19B:
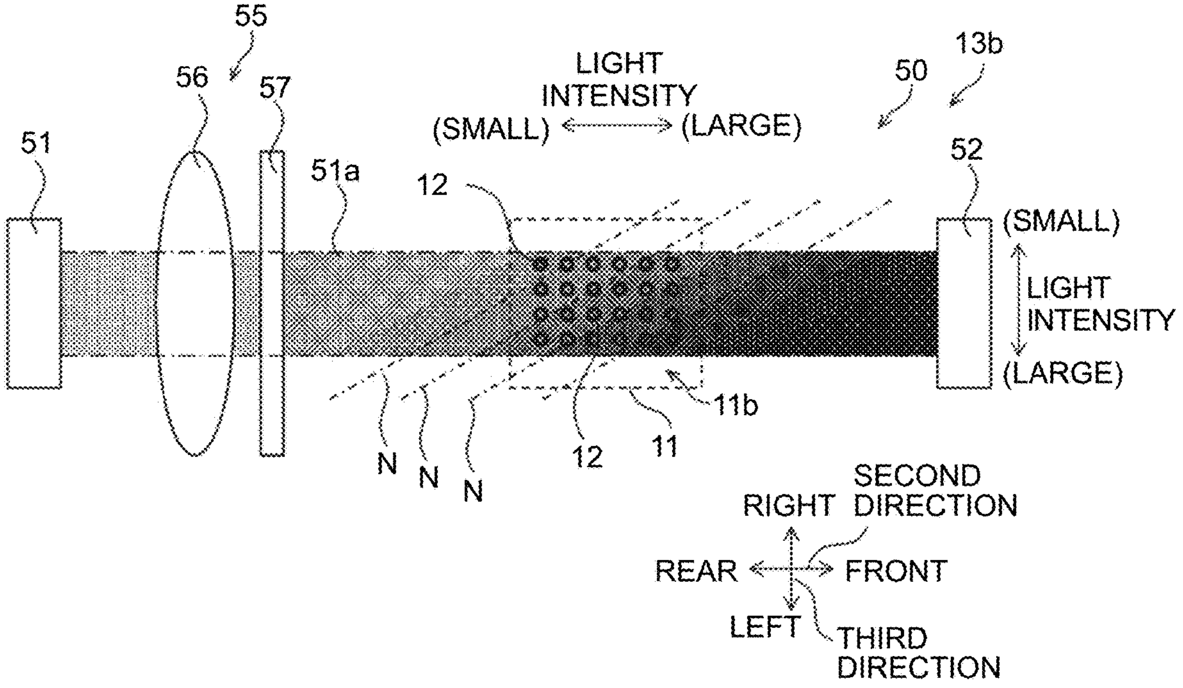
FIG. 19B is a schematic view of the detecting unit depicted in FIG. 19A in a fourth arrangement viewed from above.

Specifically, as depicted in FIG. 2, an arrangement changing device 62, which is provided for the printing apparatus 10, is configured so that the arrangement of the detecting unit 50 is changed between the third arrangement depicted in FIG. 19A and the fourth arrangement depicted in FIG. 19B, for example, by rotating the optical filter 57 about the center of the axis extending in the front-rear direction to invert the optical filter 57 in the left-right direction with respect to the light-emitting element 51.

In the third arrangement depicted in FIG. 19A and the fourth arrangement depicted in FIG. 19B, the light is emitted frontwardly from the light-emitting element 51, and the optical path 51*a* thereof extends in the front-rear direction. The lens 56 is arranged while intersecting the optical path

51*a* so that the light intensity of the optical path 51*a* is increased at more frontward positions. Further, in the third arrangement depicted in FIG. 19A, the optical filter 57 is arranged while intersecting the optical path 51*a* so that the light intensity of the optical path 51*a* is decreased at more leftward positions. On the contrary, in the fourth arrangement depicted in FIG. 19B, the optical filter 57 is arranged while intersecting the optical path 51*a* so that the light intensity of the optical path 51*a* is decreased at more rightward positions. Accordingly, the contour lines N of the light intensity in the third arrangement depicted in FIG. 19A and the contour lines N of the light intensity in the fourth arrangement depicted in FIG. 19B are bilaterally symmetrical to one another in relation to the line extending in the front-rear direction.

In the respective arrangements of the third arrangement and the fourth arrangement as described above, the controller 20 executes the detecting action by discharging the ink droplet I from the mutually identical nozzle 12. Accordingly, the controller 20 obtains the light-receiving signals of the heights each corresponding to the decrement of the light-receiving amount caused by the interruption of the optical path 51*a* by the ink droplet I in the respective arrangements of the third arrangement and the fourth arrangement. Then, the controller 20 obtains the contour line N of the light intensity corresponding to the height of the light-receiving signal in the third arrangement and the contour line N of the light intensity corresponding to the height of the light-receiving signal in the fourth arrangement, and the controller 20 obtains the point of intersection between these contour lines N. Then, the controller 20 obtains, as the deviation amount of the flying direction of the ink droplet I, the space between the point of intersection and the predetermined flying direction B0 from the nozzle 12 in the direction orthogonal to the up-down direction. In this manner, the controller 20 can detect the deviation amount of the flying direction of the ink droplet I discharged from the nozzle 12 on the basis of the light-receiving signals corresponding to the light-receiving amounts of the light-receiving element 52 receiving the light allowed to pass through the optical filter 57 in the respective arrangements of the third arrangement and the fourth arrangement. For example, the discharge timing of the ink droplet I is corrected depending on the deviation amount. Thus, it is possible to reduce the deterioration of the image quality of the printed image resulting from the deviation of the flying direction of the ink droplet I.

Sixteenth Modified Embodiment

A printing apparatus 10 according to a sixteenth modified embodiment is configured as follows. That is, in the embodiment and the sixth to thirteenth modified embodiments described above, as depicted in FIG. 20A and FIG. 20B, an optical filter 57*d* includes a first portion 57*d*1 which adds the gradient so that the light intensity of the optical path 51*a* is decreased in one direction of the left-right direction, and a second portion 57*d*2 which adds the gradient so that the light intensity of the optical path 51*a* is decreased in the other direction of the left-right direction. The controller 20 detects the deviation amount of the flying direction of the ink droplet I discharged from the nozzle 12 on the basis of the light-receiving amounts of the light-receiving element 52 receiving the light allowed to pass through the respective portions of the first portion 57*d*1 and the second portion 57*d*2.

Figure 20A:
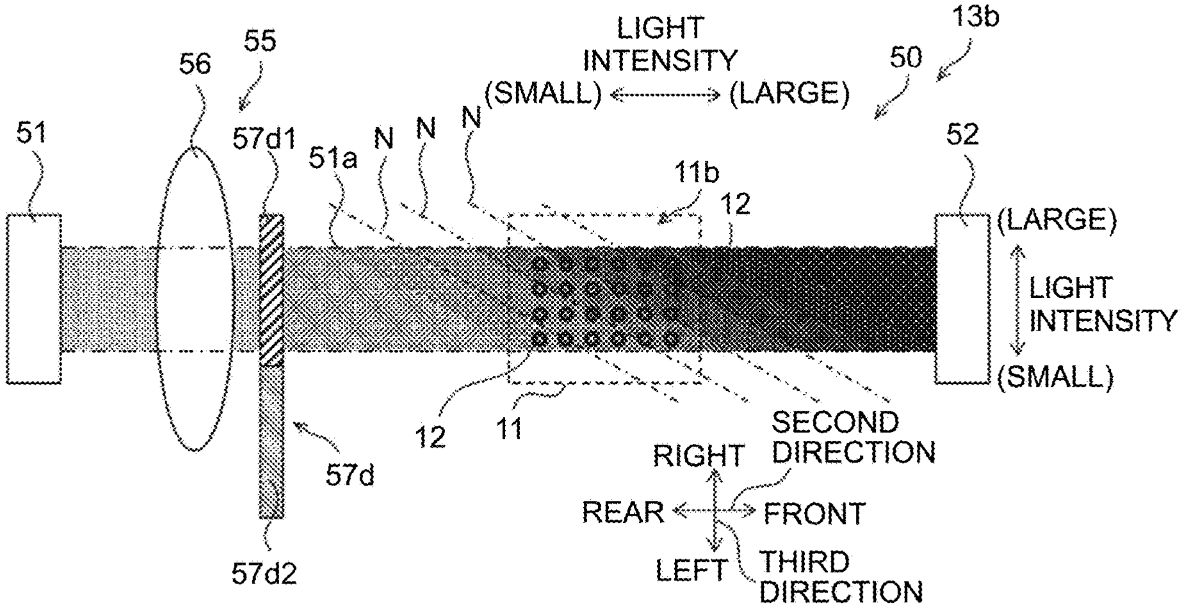
FIG. 20A is a schematic view of a detecting unit, in a printing apparatus, in a fifth arrangement viewed from above.
Figure 20B:
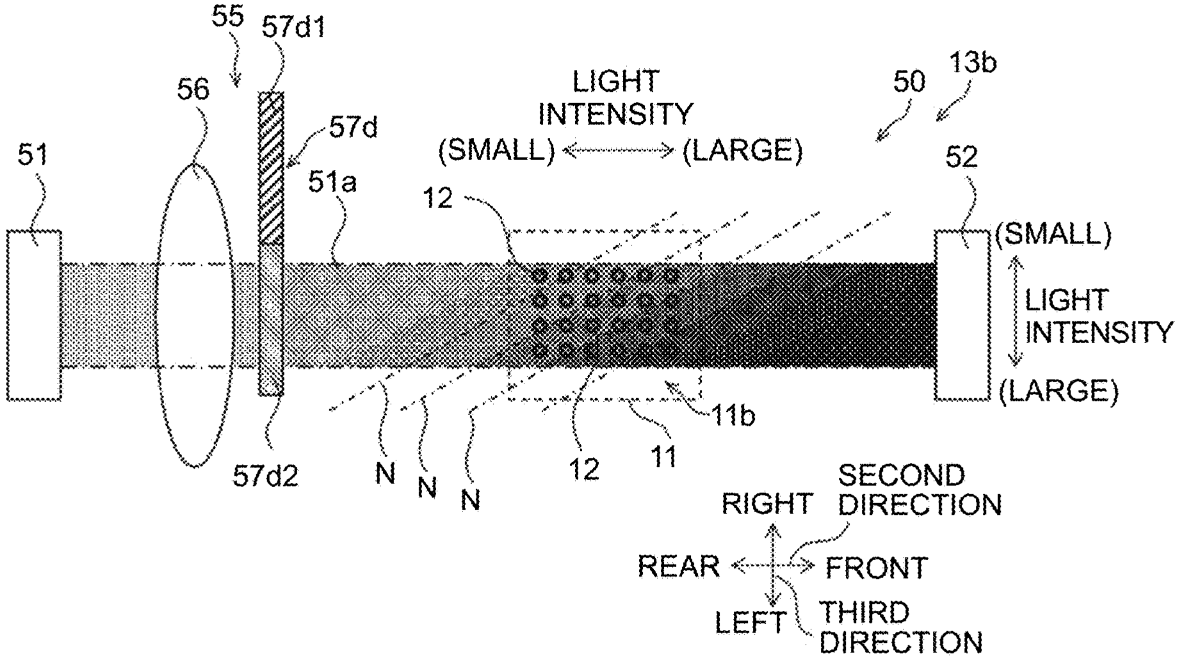
FIG. 20B is a schematic view of the detecting unit depicted in FIG. 20A in a sixth arrangement viewed from an upper position.

Specifically, as depicted in FIG. 2, an arrangement changing device 62, which is provided for the printing apparatus 10, is configured such that the arrangement of the detecting unit 50 is changed between a fifth arrangement depicted in FIG. 20A in which the light emitted from the light-emitting element 51 passes through the first portion 57*d*1 of the optical filter 57*d* and a sixth arrangement depicted in FIG. 20B in which the light emitted from the light-emitting element 51 passes through the second portion 57*d*2 of the optical filter 57*d*, for example, by moving the optical filter 57*d* in the left-right direction.

In the fifth arrangement depicted in FIG. 20A and the sixth arrangement depicted in FIG. 20B, the light is emitted frontwardly from the light-emitting element 51. The optical path 51*a* thereof extends in the front-rear direction. The lens 56 is arranged while intersecting the optical path 51*a* so that the light intensity of the optical path 51*a* is increased at more frontward positions. Further, in the fifth arrangement depicted in FIG. 20A, the first portion 57*d*1 of the optical filter 57*d* is arranged between the light-emitting element 51 and the light-receiving element 52. The light, which is emitted from the light-emitting element 51, is allowed to pass through the first portion 57*d*1, and the light intensity of the optical path 51*a* passed through the first portion 57*d*1 is decreased at more leftward positions. On the contrary, in the sixth arrangement depicted in FIG. 20B, the second portion 57*d*2 of the optical filter 57*d* is arranged between the light-emitting element 51 and the light-receiving element 52. The light, which is emitted from the light-emitting element 51, is allowed to pass through the second portion 57*d*2, and the light intensity of the optical path 51*a* passed through the second portion 57*d*2 is decreased at more rightward positions. Accordingly, the contour lines N of the light intensity of the optical path 51*a* in the fifth arrangement depicted in FIG. 20A and the contour lines N of the light intensity of the optical path 51*a* in the sixth arrangement depicted in FIG. 20B are bilaterally symmetrical to one another in relation to the line extending in the front-rear direction. In the respective arrangements of the fifth arrangement and the sixth arrangement as described above, the controller 20 executes the detecting action by discharging the ink droplet I from the mutually identical nozzle 12. Accordingly, the controller 20 obtains the light-receiving signals of the heights each corresponding to the decrement of the light-receiving amount caused by the interruption of the optical path 51*a* by the ink droplet I in the respective arrangements of the fifth arrangement and the sixth arrangement. Then, the controller 20 obtains the contour line N of the light intensity corresponding to the height of the light-receiving signal in the fifth arrangement and the contour line N of the light intensity corresponding to the height of the light-receiving signal in the sixth arrangement, and the controller 20 obtains the point of intersection between these contour lines N. Then, the controller 20 obtains, as the deviation amount of the flying direction of the ink droplet I, the space between the point of intersection and the predetermined flying direction B0 from the nozzle 12 in the direction orthogonal to the up-down direction. In this manner, the controller 20 can detect the deviation amount of the flying direction of the ink droplet I discharged from the nozzle 12 on the basis of the light-receiving signals corresponding to the light-receiving amounts of the light-receiving element 52 receiving the light allowed to pass through the respective portions of the first portion 57*d*1 and the second portion 57*d*2. For example, the discharge timing of the ink droplet I is corrected depending on the deviation amount. Thus, it is possible to reduce the deterioration of the image quality of the printed image resulting from the deviation of the flying direction of the ink droplet I.

Seventeenth Modified Embodiment

A printing apparatus 10 according to a seventeenth modified embodiment is configured as follows. That is, in the embodiment and the fourth modified embodiment described above, as depicted in FIG. 9A, the gradient adding member 55 includes a lens 56 which adds the gradient to the light intensity of the optical path 51*a* in the front-rear direction. The light-emitting element 51*c* has a plurality of light sources 53 which is arranged in a plurality of areas. The controller 20 switches the driving of the light-emitting element 51*c* between a third light emission mode (an example of "first light emission mode") in which the light-emitting element 51*c* is driven to provide such a third pattern (an example of "first pattern") that the light intensity differs between the light coming from the light sources 53 arranged in one area in the left-right direction of the plurality of areas and the light coming from the light sources 53 arranged in the other area and a fourth light emission mode (an example of "second light emission mode") in which the light-emitting element 51*c* is driven to provide a fourth pattern (an example of "second pattern") different from the third pattern. Further, the controller 20 detects the deviation amount of the flying direction of the ink droplet I discharged from the nozzle 12 on the basis of the light-receiving amounts of the light-receiving element 52 receiving the light coming from the light-emitting element 51*c* in the respective modes of the third light emission mode and the fourth light emission mode.

Specifically, the lens 56 is the same as or equivalent to, for example, the lens 56 depicted in FIG. 3B. The light is not converged in the left-right direction, and the light is converged so that the dimension in the up-down direction is decreased at more frontward positions. Accordingly, the lens 56 adds the gradient to the light intensity of the optical path 51*a* in the front-rear direction so that the light intensity is increased at more frontward positions. Further, as depicted in FIG. 9B, the light-emitting element 51*c* has the plurality of areas (for example, a fifth area 59*e* to an eighth area 59*h*). The plurality of (for example, three) light sources 53 is provided in each of the areas of the fifth area 59*e* to the eighth area 59*h*. The light intensity of the light emitted by each of the light sources 53 is variable, and the light intensity is controlled by the controller 20.

In the third light emission mode, the controller 20 controls the light-emitting element 51*c* so that the light intensity of the light emitted by the light sources 53 is decreased in an order of the light sources 53 in the fifth area 59*e*, the light sources 53 in the sixth area 59*f*, the light sources 53 in the seventh area 59*g*, and the light sources 53 in the eighth area 59*h*. The third pattern is a pattern, in which the light intensity of the light source 53 in the fifth area 59*e* is larger than the light intensity of the light source 53 in the eighth area 59*h*, and by which the light intensity of the optical path 51*a* coming from the light-emitting element 51*c* has such a gradient that the light intensity is increased at more rightward positions. Further, in the fourth light emission mode, the controller 20 controls the light-emitting element 51*c* so that the light intensity of the light emitted by the light source 53 is increased in an order of the light sources 53 in the fifth area 59*e*, the light sources 53 in the sixth area 59*f*, the light sources 53 in the seventh area 59*g*, and the light sources 53 in the eighth area 59*h*. The fourth pattern is a pattern, in which the light intensity of the light source 53 in the fifth area 59*e* is smaller than the light intensity of the light source 53 in the eighth area 59*h*, and by which the light intensity of the optical path 51*a* coming from the light-emitting element 51*c* has such a gradient that the light intensity is increased at more leftward positions. Accordingly, the contour lines N of the light intensity in the third light emission mode and the contour lines N of the light intensity in the fourth light emission mode are bilaterally symmetrical to one another in relation to the line extending in the front-rear direction.

In the respective light emission modes of the third light emission mode and the fourth light emission mode as described above, the controller 20 executes the detecting action by discharging the ink droplet I from the mutually identical nozzle 12. Accordingly, the controller 20 obtains the light-receiving signals of the heights each corresponding to the decrement of the light-receiving amount caused by the interruption of the optical path 51*a* by the ink droplet I in the respective light emission modes of the third light emission mode and the fourth light emission mode. Then, the controller 20 obtains the contour line N of the light intensity corresponding to the height of the light-receiving signal in the third light emission mode and the contour line N of the light intensity corresponding to the height of the light-receiving signal in the fourth light emission mode, and the controller 20 obtains the point of intersection between these contour lines N. Then, the controller 20 obtains, as the deviation amount of the flying direction of the ink droplet I, the space between the point of intersection and the predetermined flying direction B0 from the nozzle 12 in the direction orthogonal to the up-down direction. In this manner, the controller 20 can detect the deviation amount of the flying direction of the ink droplet I discharged from the nozzle 12 on the basis of the light-receiving signals corresponding to the light-receiving amounts of the light-receiving element 52 receiving the light coming from the light-emitting element 51*c* in the respective light emission modes of the third light emission mode and the fourth light emission mode. For example, the discharge timing of the ink droplet I is corrected depending on the deviation amount. Thus, it is possible to reduce the deterioration of the image quality of the printed image resulting from the deviation of the flying direction of the ink droplet I.

Other Modified Embodiments

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment and the modified embodiments described above, the lens 56 adds the gradient to the light intensity of the optical path 51*a* so that the light intensity is increased at more frontward positions by converging the light emitted frontwardly. However, the lens 56 may add the gradient to the light intensity of the optical path 51*a* so that the light intensity is decreased at more frontward positions by diverging the light emitted frontwardly.

Note that the embodiment and the modified embodiments thereof may be combined with each other provided that the embodiment and the modified embodiments do not mutually exclude the other party. Further, according to the foregoing explanation, many improvements and other embodiments of the present disclosure are obvious to those skilled in the art. Therefore, the foregoing explanation should be interpreted only as exemplification, which is provided in order to teach the best mode for carrying out the present disclosure to those skilled in the art. Details of the structure and/or the function of the present disclosure can be substantially changed without deviating from the spirit of the present disclosure.

In the embodiment and the modified embodiments described above, the printing apparatus 10 discharges the ink droplet I, and the detecting unit 50 detects the deviation of the flying direction of the ink droplet I. However, there is no limitation thereto. The printing apparatus 10 may be configured to form an image by discharging any arbitrary liquid droplet. Further, the detecting unit 50 may be configured to detect the deviation of the flying direction of any arbitrary liquid droplet. The arbitrary liquid droplet may be either the ink droplet or any liquid droplet of any liquid other than the ink.

What is claimed is:

1. A printing apparatus comprising:

a head having a discharge surface in which a nozzle configured to discharge a liquid droplet in a first direction is opened;

a light-emitter configured to emit light;

a light-receiver configured to receive the light emitted from the light-emitter;

a gradient adding member configured to add a gradient to a light intensity of an optical path of the light emitted from the light-emitter in each of a second direction and a third direction, the second direction and the third direction intersecting the first direction, the second direction and the third direction intersecting with each other; and a controller, wherein:

the optical path intersects a flying area in which the liquid droplet discharged from the nozzle flies at a position between the gradient adding member and the light-receiver; and the controller is configured to detect a deviation of a flying direction of the liquid droplet discharged from the nozzle based on an amount of the light received by the light-receiver.

2. The printing apparatus according to claim 1, wherein the gradient adding member includes:

a lens configured to add the gradient to the light intensity of the optical path in the second direction; and one or more optical filter of an absorption type or a reflection type configured to add the gradient to the light intensity of the optical path in the third direction.

3. The printing apparatus according to claim 2, wherein the optical filters are arranged in the second direction.

4. The printing apparatus according to claim 2, wherein the optical filter is arranged so that the optical filter is inclined with respect to the second direction and the third direction.

5. The printing apparatus according to claim 2, wherein:

arrangement of the optical filter includes a first arrangement in which the optical filter adds the gradient to the light intensity of the optical path such that the light intensity decreases toward a first side in the third direction, and a second arrangement in which the optical filter adds the gradient to the light intensity of the optical path such that the light intensity decreases toward a second side opposite to the first side in the third direction; and the controller is configured to detect a deviation amount of the flying direction of the liquid droplet discharged from the nozzle based on the amount of the light received by the light-receiver receiving the light having passed through the optical filter in the first arrangement and the amount of the light received by the light-receiver receiving the light having passed through the optical filter in the second arrangement.

6. The printing apparatus according to claim 2, wherein:

the optical filter has a first portion configured to add the gradient to the light intensity of the optical path such that the light intensity decreases toward a first side in the third direction and a second portion configured to add the gradient to the light intensity of the optical path such that the light intensity decreases toward a second side opposite to the first side in the third direction; and the controller is configured to detect a deviation amount of the flying direction of the liquid droplet discharged from the nozzle based on the amount of the light received by the light-receiver receiving the light having passed through the first portion and the amount of the light received by the light-receiver receiving the light having passed through the second portion.

7. The printing apparatus according to claim 1, wherein the gradient adding member includes a lens, having an asymmetrical shape, configured to add the gradient to the light intensity of the optical path in both of the second direction and the third direction.

8. The printing apparatus according to claim 1, wherein the gradient adding member includes:

a lens configured to add the gradient to the light intensity of the optical path in the second direction; and a frame which includes an opening configured to allow a part of the light emitted from the light-emitter to pass through the opening so that the light intensity of the optical path has the gradient in the third direction.

9. The printing apparatus according to claim 1, wherein:

the gradient adding member includes a lens configured to add the gradient to the light intensity of the optical path in the second direction; and the light-emitter has a plurality of light sources arranged in a plurality of areas, a number of a light source, of the plurality of light sources, arranged in a first area of the plurality of areas being different from a number of a light source, of the plurality of light sources, arranged in a second area of the plurality of areas, the first area and the second area being shifted from each other in the third direction.

10. The printing apparatus according to claim 1, wherein:

the gradient adding member includes a lens configured to add the gradient to the light intensity of the optical path in the second direction; and the light-emitter has a plurality of light sources arranged in a plurality of areas, a light intensity of light from a light source, of the plurality of light sources, arranged in a first area of the plurality of areas being different from a light intensity of light from a light source, of the plurality of light sources, arranged in a second area of the plurality of areas, the first area and the second area being shifted from each other in the third direction.

11. The printing apparatus according to claim 1, wherein the gradient adding member includes:

a lens configured to add the gradient to the light intensity of the optical path in the second direction; and a concave mirror or a convex mirror having a curved surface configured to reflect the light emitted from the light-emitter, the concave mirror or the convex mirror being configured to add the gradient to the light intensity of the optical path in the third direction.

12. The printing apparatus according to claim 1, wherein the light-emitter and the light-receiver are arranged so that the optical path is inclined with respect to the first direction and the second direction.

13. The printing apparatus according to claim 1, wherein the light-emitter and the light-receiver are arranged so that a distance in the first direction from the discharge surface to the optical path is longest, while fulfilling a condition that a value being a predetermined number times of a standard deviation of a normal distribution indicating a probability distribution of a landing position of the liquid droplet on the printing medium exists within a threshold value of positional deviation of the liquid droplet landed on the printing medium.

14. The printing apparatus according to claim 1 further comprising a plurality of amplifiers configured to amplify a signal corresponding to the amount of the light received by the light-receiver at mutually different amplification factors, wherein:

the nozzle includes a first nozzle and a second nozzle, the first nozzle and the second nozzle being arranged at different positions in the third direction;

the light intensity of the optical path at a flying position of the liquid droplet from the second nozzle is smaller than the light intensity of the optical path at a flying position of the liquid droplet from the first nozzle; and the controller is configured to amplify the signal by a first amplifier, of the plurality of amplifiers, in a case that the first nozzle discharges the liquid droplet, and amplify the signal by a second amplifier, of the plurality of amplifiers, in a case that the second nozzle discharges the liquid droplet, an amplification factor of the second amplifier being larger than an amplification factor of the first amplifier.

15. The printing apparatus according to claim 1, wherein:

the gradient adding member includes a lens configured to add the gradient to the light intensity of the optical path in the second direction;

the nozzle includes a first nozzle and a second nozzle, the first nozzle and the second nozzle are arranged at different positions in the third direction; and the controller is configured to switch driving of the light-emitter between a first light emission mode and a second light emission mode, the first light emission mode being a mode in which the light-emitter is driven to provide a first pattern in which the light intensity of the optical path at a flying position of the liquid droplet discharged from the second nozzle is smaller than the light intensity of the optical path at a flying position of the liquid droplet discharged from the first nozzle, the second light emission mode being a mode in which the light-emitter is driven to provide a second pattern in which the light intensity of the optical path at the flying position of the liquid droplet discharged from the second nozzle is large as compared with the first pattern.

16. The printing apparatus according to claim 1, wherein:

a signal waveform indicating a temporal variation of the amount of the light received by the light-receiver is configured to represent the amount of the light received by the light-receiver by a height of the signal waveform and represent an elapsed time by a width of the signal waveform; and in a case that the signal waveform corresponding to the liquid droplet flying in a first manner is symmetric in a widthwise direction of the signal waveform, the controller is configured to determine that a size of the liquid droplet discharged in a second manner is different from a size of the liquid droplet discharged in the first manner, if a width of the waveform signal corresponding to the liquid droplet flying in the second manner is same as a width of the waveform signal corresponding to the liquid droplet flying in the first manner and a difference between a height of the waveform signal corresponding to the liquid droplet flying in the second manner and a height of the waveform signal corresponding to the liquid droplet flying in the first manner is not less than a predetermined value.

17. The printing apparatus according to claim 1, wherein:

a signal waveform indicating a temporal variation of the amount of the light received by the light-receiver is configured to represent the amount of the light received by the light-receiver by a height of the signal waveform and represent an elapsed time by a width of the signal waveform; and in a case that the signal waveform corresponding to the liquid droplet flying in a first manner is symmetric in a widthwise direction of the signal waveform, the controller is configured to determine that a speed of the liquid droplet discharged in a second manner is different from a speed of the liquid droplet discharged in the first manner, if a height of the waveform signal corresponding to the liquid droplet flying in the second manner is same as a height of the waveform signal corresponding to the liquid droplet flying in the first manner and a difference between a width of the waveform signal corresponding to the liquid droplet flying in the second manner and a width of the waveform signal corresponding to the liquid droplet flying in the first manner is not less than a predetermined value.

18. The printing apparatus according to claim 1, wherein:

the nozzle is a plurality of nozzles, openings of the plurality of nozzles being arranged in an arrangement direction to form an array on the discharge surface;

arrangement of the light-emitter includes a first arrangement in which an angle between an extending direction of the optical path and the arrangement direction is a first angle, and a second arrangement in which the angle is a second angle different from the first angle; and the controller is configured to detect a deviation amount of the flying direction of the liquid droplet discharged from the nozzle based on the amount of the light received by the light-receiver receiving the light emitted from the light-emitter in the first arrangement and the amount of the light received by the light-receiver receiving the light emitted from the light-emitter in the second arrangement.

19. The printing apparatus according to claim 1, wherein:

the gradient adding member includes a lens configured to add the gradient to the light intensity of the optical path in the second direction;

the light-emitter has a plurality of light sources arranged in a plurality of areas; and the controller is configured to:

switch driving of the light-emitter between a first light emission mode and a second light emission mode, the first light emission mode is a mode in which the light-emitter is driven to provide a first pattern in which the light intensity of the light from a light source, of the plurality of light sources, arranged in a first area of the plurality of areas and the light intensity of the light from a light source, of the plurality of light sources, arranged in a second area of the plurality of areas are different from each other, the first area and the second area being shifted from each other in the third direction, the second light emission mode is a mode in which the light-emitter is driven to provide a second pattern different from the first pattern; and detect a deviation amount of the flying direction of the liquid droplet discharged from the nozzle based on the amount of the light received by the light-receiver receiving the light emitted from the light-emitter in the first light emission mode and the amount of the light received by the light-receiver receiving the light emitted from the light-emitter in the second light emission mode.

20. A discharge state detecting apparatus for detecting a discharge state of a liquid droplet discharged from a head having a discharge surface in which a nozzle configured to discharge a liquid droplet in a first direction is opened, the discharge state detecting apparatus comprising;

a light-emitter configured to emit light;

a light-receiver configured to receive the light emitted from the light-emitter;

a gradient adding member configured to add a gradient to a light intensity of an optical path of the light emitted from the light-emitter in each of a second direction and a third direction, the second direction and the third direction intersecting the first direction, the second direction and the third direction intersecting with each other; and a controller configured to detect a deviation of a flying direction of the liquid droplet discharged from the nozzle based on an amount of the light received by the light-receiver in a case that the liquid droplet discharged from the nozzle travels through the optical path at a position between the gradient adding member and the light-receiver.

21. A discharge state detecting method for detecting a discharge state of a liquid droplet in a printing apparatus:

the printing apparatus including:

a head having a discharge surface in which a nozzle configured to discharge a liquid droplet in a first direction is opened;

a light-emitter configured to emit light;

a light-receiver configured to receive the light emitted from the light-emitter;

a gradient adding member; and a controller, the method comprising:

adding a gradient to a light intensity of an optical path of the light emitted from the light-emitter in each of a second direction and a third direction by the gradient adding member, the second direction and the third direction intersecting the first direction, the second direction and the third direction intersecting with each other;

causing the nozzle to discharge the liquid droplet, by the controller, so that the liquid droplet travels through the optical path to which the gradient is added; and detecting, by the controller, a deviation of a flying direction of the liquid droplet discharged from the nozzle based on an amount of the light received by the light-receiver in a case that the liquid droplet travels through the optical path.

* * * * *